(12) United States Patent
Heo et al.

(10) Patent No.: US 10,671,217 B2
(45) Date of Patent: *Jun. 2, 2020

(54) TOUCH PROCESSING METHOD AND ELECTRONIC DEVICE FOR SUPPORTING THE SAME

(71) Applicant: Samsung Electronics Co., Ltd., Gyeonggi-do (KR)

(72) Inventors: Hoon Do Heo, Gyeonggi-do (KR); Heon Seok Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,598

(22) Filed: Feb. 11, 2019

(65) Prior Publication Data

US 2019/0171335 A1   Jun. 6, 2019

Related U.S. Application Data

(63) Continuation of application No. 16/011,111, filed on Jun. 18, 2018, now Pat. No. 10,203,810, which is a
(Continued)

(30) Foreign Application Priority Data

Feb. 26, 2015 (KR) .................. 10-2015-0027628

(51) Int. Cl.
*G06F 3/041* (2006.01)

(52) U.S. Cl.
CPC .......... *G06F 3/0418* (2013.01); *G06F 3/0412* (2013.01); *G06F 2203/04102* (2013.01);
(Continued)

(58) Field of Classification Search
CPC .......... G02F 1/13338; G02F 1/133512; G06F 3/0304; G06F 3/042; G06F 3/0484;
(Continued)

(56) References Cited

U.S. PATENT DOCUMENTS 9,285,989 B2   3/2016   Park et al.
9,454,251 B1*  9/2016   Guihot .................. G08C 17/02
(Continued)

FOREIGN PATENT DOCUMENTS

CN   102479041   5/2012
CN   103019309   4/2013
(Continued)

OTHER PUBLICATIONS

European Search Report dated Jun. 29, 2016 issued in counterpart application No. 16157695.4-1959, 7 pages.
(Continued)

*Primary Examiner* — Dmitriy Bolotin
(74) *Attorney, Agent, or Firm* — The Farrell Law Firm, P.C.

(57) ABSTRACT

An electronic device and method thereof are provided. In one aspect, the electronic device includes a housing, a touch screen with edges, and one or more processors. First and second touch recognition regions are defined adjacent to one of the touch screen edges. The one or more processors determine whether to ignore a touch input based at least on whether the touch input is in one of the first and second touch recognition region and at least one of the type and the duration of the touch input.

8 Claims, 9 Drawing Sheets

Related U.S. Application Data continuation of application No. 15/053,615, filed on Feb. 25, 2016, now Pat. No. 10,019,018.

(52) U.S. Cl.
CPC .............. *G06F 2203/04104* (2013.01); *G06F 2203/04108* (2013.01)

(58) Field of Classification Search
CPC ..... G06F 3/0488; G09F 9/35; G09G 2300/04; G09G 2360/14; G09G 3/3413; G09G 3/36; H01L 27/14605; H01L 27/14607; H01L 27/14612; H01L 27/14623; H01L 27/14636; H01L 27/14645; H01L 27/14649; H01L 27/323; H01L 27/3234; H01L 31/1055; H04N 1/10; H04N 5/335
See application file for complete search history.

(56) References Cited

U.S. PATENT DOCUMENTS

| | | | |
|---|---|---|---|
| 9,535,520 B2 | 1/2017 | Park et al. | |
| 9,671,911 B2 | 6/2017 | Yang et al. | |
| 10,019,108 B2* | 7/2018 | Heo | G06F 3/0412 |
| 10,203,810 B2* | 2/2019 | Heo | G06F 3/0412 |
| 2009/0174679 A1* | 7/2009 | Westerman | G06F 3/03547 |
| | | | 345/173 |
| 2011/0285645 A1 | 11/2011 | Cho et al. | |
| 2012/0075212 A1 | 3/2012 | Park et al. | |
| 2012/0287076 A1 | 11/2012 | Dao et al. | |
| 2013/0033434 A1* | 2/2013 | Richardson | G06F 3/0488 |
| | | | 345/173 |
| 2013/0207913 A1 | 8/2013 | Takashima et al. | |
| 2013/0222287 A1* | 8/2013 | Bae | G06F 3/041 |
| | | | 345/173 |
| 2013/0271447 A1 | 10/2013 | Setlur et al. | |
| 2014/0129994 A1* | 5/2014 | Louch | G06F 1/1626 |
| | | | 715/863 |
| 2014/0176470 A1 | 6/2014 | Huang | |
| 2014/0232676 A1* | 8/2014 | Shimizu | G06F 3/041 |
| | | | 345/173 |
| 2014/0281962 A1* | 9/2014 | Won | G06F 3/0482 |
| | | | 715/705 |
| 2014/0300559 A1* | 10/2014 | Tanimoto | G06F 3/0416 |
| | | | 345/173 |
| 2014/0351768 A1 | 11/2014 | Park | |
| 2014/0375582 A1 | 12/2014 | Park et al. | |
| 2015/0123920 A1 | 5/2015 | Park et al. | |
| 2015/0338954 A1 | 11/2015 | Yang et al. | |

FOREIGN PATENT DOCUMENTS

| | | |
|---|---|---|
| CN | 103902074 | 7/2014 |
| CN | 104020878 | 9/2014 |
| EP | 2 808 771 | 12/2014 |
| GB | 2472339 | 2/2011 |
| KR | 1020110127555 | 11/2011 |
| KR | 1020130038613 | 4/2013 |
| WO | WO 2014/171606 | 10/2014 |

OTHER PUBLICATIONS

International Search Report dated Jul. 11, 2016 issued in counterpart application No. PCT/KR2016/001913, 15 pages.
European Search Report dated May 8, 2018 issued in counterpart application No. 16157695.4-1221, 7 pages.
Chinese Office Action dated Jul. 31, 2019 issued in counterpart application No. 201680011127.0, 18 pages.

* cited by examiner

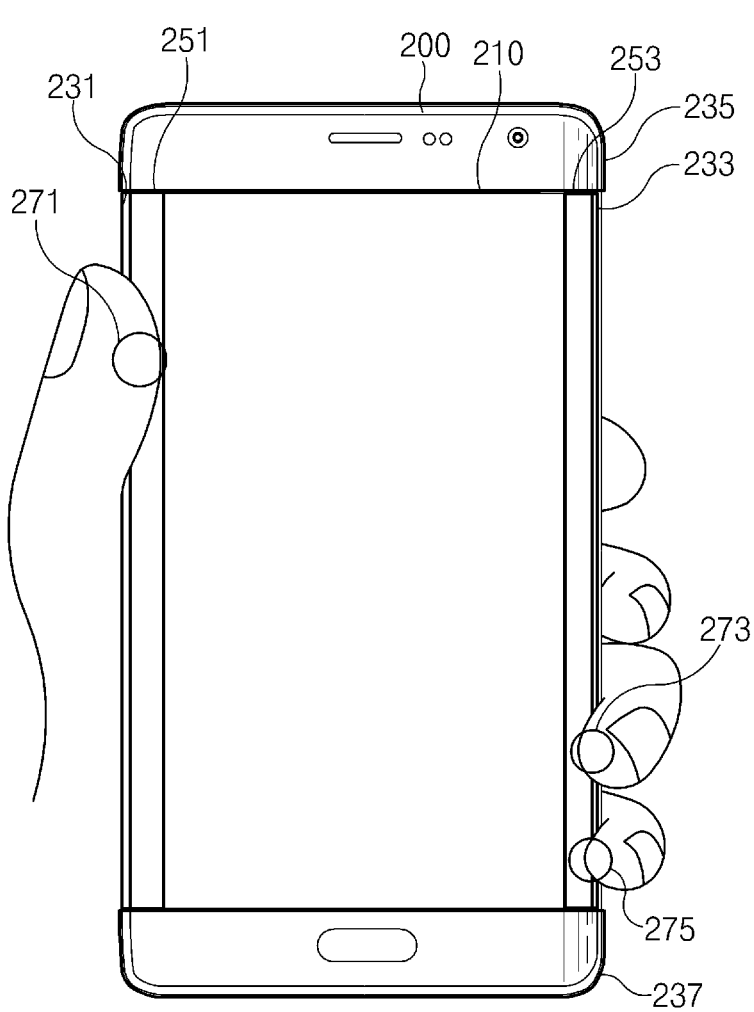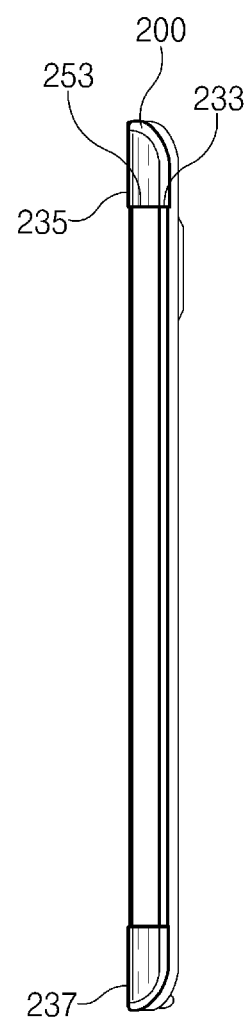
FIG. 2A
FIG. 2B

TOUCH PROCESSING METHOD AND ELECTRONIC DEVICE FOR SUPPORTING THE SAME

PRIORITY

This application is a Continuation of U.S. patent application Ser. No. 16/011,111, which was filed in the U.S. Patent and Trademark Office (USPTO) on Jun. 18, 2018, which is a Continuation of U.S. patent application Ser. No. 15/053,615, which was filed in the USPTO on Feb. 25, 2016, issued as U.S. Pat. No. 10,019,018 on Jul. 10, 2018, and claims priority under 35 U.S.C. § 119(a) to a Korean Patent Application Serial No. 10-2015-0027628, which was filed in the Korean Intellectual Property Office on Feb. 26, 2015, the entire disclosure of each of which is incorporated herein by reference.

BACKGROUND

1. Field of the Invention

The present disclosure relates generally to processing inputs, and more particularly a method and apparatus for processing touch inputs according to a distance from an edge of a screen.

2. Description of the Related Art

Electronic devices provide a variety of user interfaces to communicate, with users, information associated with functions or programs executed in the electronic device. Gradually an increasing number of electronic devices that support touch sensitive surfaces as parts of user interfaces (e.g., touch screens) have been developed. Meanwhile, along developments in technology, the sizes of bezel regions of electronic devices, which support touch screens or displays, have been gradually decreasing. A bezel region of the electronic device or a portion of region of a touch screen connected with the bezel region may include a curved region. For example, in some electronic devices, some edges of a touch screen extend to a rear surface of the electronic device, and the edges extending to the rear surface may have a curved surface.

While a user performs user input using a specific touch object (e.g., a stylus or a finger, etc.) through a touch sensor (e.g., a touch screen), another touch object (e.g., another finger or a palm, etc.) may be in contact with or close to the touch sensor.

For example, if the user grips an electronic device, in which there is no bezel region or which has a very small bezel region, a portion of region of the touch screen may be in contact with or close to part of user's body irrespective of user's intention. Contact with or proximity to a grip of the user may cause, for example, an error, such as non-recognition of a touch or a multi-touch by user, which is associated with a user input.

If a portion of region of the touch screen, for example, an edge region includes a curved surface, due to contact or proximity to the touch screen, which occurs by a grip of the user without user's intention, undesired functions may be executed, while desired functions corresponding to inputs may not be executed.

SUMMARY

An aspect of the present disclosure is to address at least the above-mentioned problems and/or disadvantages and to provide at least the advantages described below. Accordingly, an aspect of the present disclosure is to provide a method and an apparatus for detecting contact or proximity of part of user's body through a touch sensor and modifying at least part of a touch input corresponding to the contact or proximity according to a position where the contact or proximity is detected.

In accordance with an aspect of the present disclosure, an electronic device is provided, including a housing; a touch screen comprising edges; and one or more processors configured to define a first touch rejection region located adjacent to at least one of the edges of the touch screen, the first touch rejection region being defined by a boundary located a first distance from the at least one of the edges; define a second touch rejection region located adjacent to the at least one of the edges of the touch screen, the second touch rejection region being defined by a boundary located a second distance from the at least one of the edges, where the second distance is different from the first distance; when a touch input is detected in the first touch rejection region, determine whether to ignore the touch input based at least on whether the touch input corresponds to a multi-touch input; and, when a touch input is detected in the second touch rejection region, determine whether to ignore the touch input based at least on a duration of the touch input.

In accordance with another aspect of the present disclosure, an electronic device is provided, including a housing; a touch screen comprising edges; and one or more processors configured to define a first touch rejection region located adjacent to at least one of the edges of the touch screen, the first touch rejection region being defined by a first boundary; define a second touch rejection region located adjacent to the at least one of the edges of the touch screen, the second touch rejection region being defined by a second boundary, where the second boundary is different from the first boundary; when a touch input is detected in the first touch rejection region, determine whether to ignore the touch input based at least on whether the touch input corresponds to a multi-touch input; and, when a touch input is detected in the second touch rejection region, determine whether to ignore the touch input based at least on a duration of the touch input.

In accordance with another aspect of the present disclosure, a method of an electronic device is provided, including defining, by one or more processors of the electronic device, a first touch rejection region located adjacent to at least one of edges of a touch screen of the electronic device, the first touch rejection region being defined by a first boundary; defining, by the one or more processors of the electronic device, a second touch rejection region located adjacent to the at least one of the edges of the touch screen of the electronic device, the second touch rejection region being defined by a second boundary, where the second boundary is different from the first boundary; when a touch input is detected in the first touch rejection region, determining, by the one or more processors of the electronic device, whether to ignore the touch input based at least on whether the touch input corresponds to a multi-touch input; and, when a touch input is detected in the second touch rejection region, determining, by the one or more processors of the electronic device, whether to ignore the touch input based at least on a duration of the touch input.

In accordance with another aspect of the present disclosure, an electronic device is provided. The electronic device includes a touch screen configured to detect at least one touch event; and a processor configured to determine whether to recognize the at least one touch event as a touch input according to a distance between a location of the at least one touch event and an edge of the touch screen.

In accordance with another aspect of the present disclosure, a method is provided. The method includes detecting at least one touch event through a touch screen functionally connected with the electronic device; and determining whether to recognize the at least one touch event as a touch input according to a distance between a location of the at least one touch event and an edge of the touch screen.

In accordance with another aspect of the present disclosure, a non-transitory computer-readable recording medium storing embodied thereon instructions, when executed by at least one processor, for allowing the at least one processor to perform a method is provided. The method includes detecting at least one touch event through a touch screen functionally connected with the electronic device; and determining whether to recognize the at least one touch event as a touch input according to a distance between a location of the at least one touch event and an edge of the touch screen.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A and 2B are drawings illustrating a touch by a grip of a user and setting of an edge region according to an embodiment of the present disclosure;

DETAILED DESCRIPTION

Figure 1:
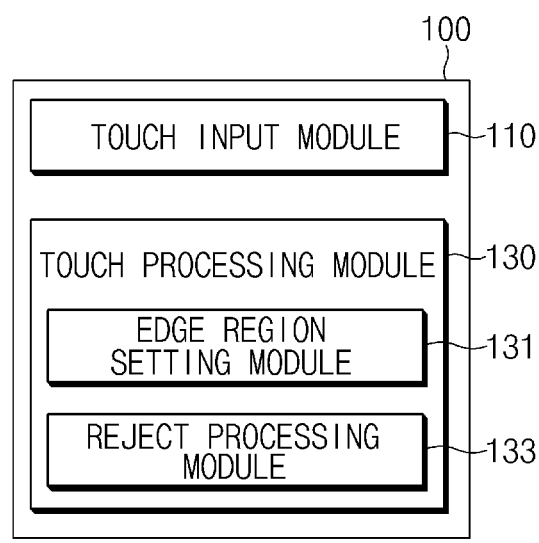
FIG. 1 is a block diagram illustrating a configuration of an electronic device associated with touch processing according to an embodiment an embodiment of the present disclosure.

Hereinafter, the present disclosure is described with reference to the accompanying drawings. However, the present disclosure is not intended to be limited to the specific embodiments, and it is understood that the present disclosure includes all modifications and/or equivalents and substitutes within the scope and technical range of the present disclosure.

Throughout the drawings, it should be noted that like reference numbers are used to depict the same or similar elements, features, and structures.

Herein, the expressions "have", "may have", "include", "comprise", "may include", and "may comprise" as used herein, indicate existence of corresponding features (e.g., elements such as numeric values, functions, operations, or components) but do not exclude presence of additional features.

Herein, the expressions "A or B", "at least one of A or/and B", or "one or more of A or/and B", etc., as used herein may include any and all combinations of one or more of the associated listed items. For example, the terms "A or B", "at least one of A and B", or "at least one of A or B" may refer to any of (1) a case in which at least one A is included, (2) a case in which at least one B is included, or (3) a case in which both of at least one A and at least one B are included.

The expressions such as "1st", "2nd", "first", or "second", etc., as used herein, may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), the first element can be directly coupled with/to or connected to the second element, or an intervening element (e.g., a third element) may be present. By contrast, when an element (e.g., a first element) is referred to as being "directly coupled with/to" or "directly connected to" another element (e.g., a second element), it should be understood that there are no intervening elements (e.g., a third element).

Depending on the situation, the expression "configured to" used herein may be interchangeable with, for example, the expression "suitable for", "having the capacity to", "designed to", "adapted to", "made to", or "capable of". The term "configured to" is not limited to being defined as "specifically designed to" with respect to hardware. Instead, the expression "a device configured to" may refer to a device that is "capable of" operating together with another device or other components. For example, a "processor configured to perform A, B, and C" may refer to a generic-purpose processor (e.g., a central processing unit (CPU) or an application processor) that may perform corresponding operations by executing one or more software programs which stores a dedicated processor (e.g., an embedded processor) for performing a corresponding operation.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same definition that is generally understood by a person skilled in the art. It will be further understood that terms, which are defined in a dictionary and commonly used, should also be interpreted as is customary in the relevant related art and not in an idealized or overly formal detect unless expressly so defined herein. In some cases, even if terms are defined in the specification, they may not be interpreted to exclude embodiments of the present disclosure.

Electronic devices according to embodiments of the present disclosure may include at least one of, for example, smart phones, tablet personal computers (PCs), mobile phones, mobile medical devices, cameras, or wearable devices. Herein, electronic devices may include one or more of the above-mentioned devices. Electronic devices according to embodiments of the present disclosure may be flexible electronic devices. Also, electronic devices according to embodiments of the present disclosure are not limited to the above-mentioned devices, and may include new electronic devices according to technological developments.

Hereinafter, electronic devices according to embodiments of the present disclosure will be described with reference to the accompanying drawings. The term "user" used herein may refer to a person who uses an electronic device or may refer to a device (e.g., an artificial intelligence electronic device) that uses an electronic device.

FIG. 1 is a block diagram illustrating a configuration of an electronic device associated with touch processing according to an embodiment of the present disclosure.

Referring to FIG. 1, an electronic device 100 includes, for example, a touch input module 110 and a touch processing module 130.

The touch input module 110 may include a touch sensor or may functionally connect with a touch sensor, and may detect a touch object (e.g., various objects, including a stylus, a finger, etc., that the touch sensor is capable of sensing) that is in contact with or close to at least part of the electronic device 100. The term "touch", as used herein may refer to at least one of contact or proximity of an object with respect to the electronic device 100.

The electronic device 100 may include, for example, a semitransparent or opaque surface, which may detect a touch input, with respect to at least part of the touch input module 100. For example, the electronic device 100 may detect contact or proximity of an object through a housing that forms an external appearance of the electronic device 100. The housing may be made of, for example, one or more of synthetic materials (e.g., plastic), conductive materials (e.g., metal), glass, ceramics, and minerals. For example, the electronic device 100 may detect contact or proximity of an object through a touch screen. According to an embodiment of the present disclosure, the touch input module 110 may connect with the electronic device 100 by wire or wirelessly through various interfaces, at a location outside of the electronic device 100.

The touch input module 110 may use various technologies to detect a touch object, which may include, for example, one or more of a pressure type, a resistive type, a capacitive type, an infrared type, an acoustic type, an optical type, a carbon nano tube (CNT) type, and an electromagnetic induction type. An image sensor, a proximity sensor, or a conductive pattern (e.g., an antenna) installed at a position adjacent to a housing of the electronic device 100 may be used to sense a touch on the electronic device 100.

The capacitive type of touch input is used to detect an input position based on a change of capacitance that occurs while an input tool or a human body is in contact with a sensing electrode which is formed of a conductive material, for example, an indium thin oxide (ITO) or a metal mesh. The capacitive type may include a mutual capacitance type touch input and a self-capacitance type touch input. The mutual capacitance type may be, for example, a type of touch input based on capacitance between two electrodes.

One electrode may be arranged on a horizontal axis and another electrode may be arranged on a vertical axis to form sensors of a lattice structure. A change of capacitance at each point may be detected by measuring capacitance generated between electrodes.

For example, the self capacitance type of touch input may be such that electrodes arranged on the abscissa axis and electrodes arranged on the ordinate axis form sensors to be independent of each other. A change of capacitance at each point may be detected by measuring capacitance generated by each electrode. The touch input module 110 may detect, for example, contact or proximity of a touch object to at least part of the electronic device 100 using the mutual capacitance type of touch input or the self-capacitance type of touch input. According to an embodiment of the present disclosure, the touch input module 110 may detect contact by the touch object using mutual capacitance and may detect proximity by the touch object using self capacitance.

The touch input module 110 may include, for example, a touch screen. The touch screen may include, for example, a separate touch screen module, which may be laminated on a display included in the electronic device 100. The touch screen may be integrated into the display using, for example, in-cell technologies or on-cell technologies. The touch input module 110 may send touch information (i.e., a touch event) corresponding to proximity or contact of a detected touch object (e.g., a touch coordinate, a touch time, or touch intensity, etc.) to the touch processing module 130. The touch event may be a kind of an input signal and may include information (e.g., touch information) associated with a touch. If proximity or contact of a touch object is detected by the touch input module 110, a touch event including corresponding touch information may be sent to the touch processing module 130.

The touch processing module 130 may receive, for example, the information (e.g., the touch event) associated with the touch from the touch input module 110 and may process a touch input. According to an embodiment of the present disclosure, the touch processing module 130 may detect a plurality of user inputs through a surface, and may modify at least one of the plurality of detected user inputs according to positions where the plurality of user inputs are detected. For example, the touch processing module 130 may change at least one of the quantity of the detected user inputs, an intensity of at least one of the detected user inputs, and a position where at least one of the detected user inputs is detected. The touch processing module 130 may also control a function associated with the electronic device 100 according to the modified user input.

According to an embodiment of the present disclosure, the touch processing module 130 may determine whether proximity or contact of a touch object is a valid touch input. If the proximity or contact of the touch object is an invalid touch input, the touch processing module 130 may refrain from controlling the electronic device 100 according to the touch input. For example, if there is a determination that a contact of a touch object is a touch by a grip of a user, the touch processing module 130 may exclude the touch from inputs for controlling the electronic device 100 (or may reject the touch).

If the user grips the electronic device 100 with the user's hand, at least part of user's hand may be in contact with a touch screen. Some of a plurality of touches detected on the touch screen may be inputs intended by the user, and some of the plurality of touches may be inputs that are not intended by user. Therefore, the touch processing module 130 may distinctively process a touch intended by the user and a touch by a grip of user in a different manner.

According to an embodiment of the present disclosure, the touch processing module 130 may compare a shape or size of an area of a contact (or an area of a proximity) region of the touch with a predetermined shape or size. For example, the touch processing module 130 may verify the shape of the contact region of the touch and may determine whether the touch is a touch by a grip of the user. If the area of the contact region of the touch is at least equal to a predetermined size, the touch processing module 130 may determine the touch as a grip of the user.

According to an embodiment of the present disclosure, the touch processing module 130 may analyze touch information (e.g., a touch coordinate, a touch time, or touch intensity, etc.) and may determine whether the corresponding touch is a valid touch. For example, the touch processing module 130 may extract a touch coordinate from the touch information and may verify whether the corresponding touch is input on a predetermined region using the touch coordinate.

According to an embodiment of the present disclosure, the touch processing module 130 may set an edge region (e.g., a left edge region 251 and a right edge region 253 of FIG. 2A) corresponding to at least part of a region of the touch screen. The touch processing module 130 may discriminate a touch by a grip of the user using the edge region. The edge region may be a region that has a high possibility that a touch by a grip of the user will occur, from among regions that may perform touch recognition. For example, the edge region may be a region that is in contact with a touch object (e.g., some of fingers of the user) when a user grips the electronic device 100 and may be set to a region that is present within a predetermined distance in an inner direction (i.e., a direction towards an interior) of the electronic device 100 from both edges of the touch screen. The touch processing module 130 may process a touch input recognized on the edge region according to a state (e.g., a sleep mode) of the electronic device 100, a shape (e.g., a shape according to whether an edge is formed with a curved surface) of the touch screen, a type of an executed application, or a type (e.g., a long press touch or a multi-touch, etc.) of the touch input recognized on the edge region to be different from a touch input recognized on a region except for the edge region.

According to an embodiment of the present disclosure, the touch processing module 130 may detect a touch object that is close to (or hovering over) an edge of the touch screen, and may determine whether the user grips the electronic device 100 according to information associated with a size, a shape, or sensitivity associated with the detected touch object. For example, the touch processing module 130 may detect a touch object which is close to an edge of the touch screen using self capacitance. The touch processing module 130 may detect that a hand of the user is in contact with or close to the electronic device 100, while using at least one electrode column, on at least one of a left edge region or a right edge region of the touch screen. The touch processing module 130 may alternately measure, for example, mutual capacitance and self capacitance at least once during intervals of a predetermined time. For example, the touch processing module 130 may detect contact using mutual capacitance and may detect proximity using self capacitance.

The touch processing module 130 may periodically or intermittently activate, for example, at least one electrode column which is present on an edge of the touch screen in a state where the electronic device 100 is in a low power-saving mode (e.g., a sleep mode) and may measure self capacitance or mutual capacitance. For example, if a grip of the user is detected while the electronic device 100 is in a low power-saving mode (e.g., the sleep mode), the touch processing module 130 may send information associated with the grip to a processor (e.g., an application processor) of the electronic device 100. If the information associated with the grip is received, the processor (e.g., the application processor) of the electronic device 100 may be changed from an inactive state to an active state.

To perform the above-mentioned functions, the touch processing module 130 may include an edge region setting module 131 and a reject processing module 133.

The edge region setting module 131 may set a portion of region of the touch screen to an edge region. The edge region may be a set of regions that have a high possibility of being touched by a grip of the user. For example, the edge region may be located on each of two edges of the touch screen and may be a region that has a high possibility that some of fingers of the user will be in contact with the region when user grips the electronic device 100. According to an embodiment of the present disclosure, the edge region setting module 131 may set the edge region in a different way according to a size of a bezel region of the electronic device 100 or a shape of the touch screen, etc. For example, the edge region setting module 131 may set the edge region to be broader when a size of the bezel region is smaller (e.g., when a width of the bezel region is narrower). The edge region may be set to include, for example, at least part of a housing of the electronic device 100.

According to an embodiment of the present disclosure, a surface or a display region which may perform touch recognition of the electronic device 100 may include a curved surface shape. For example, the touch screen is extended to at least one side (e.g., at least one of a left side, a right side, an upper side, and a lower side) of the electronic device 100, may be bent to have a curvature radius, and may be coupled to the housing of the electronic device 100. For example, if a portion of region of the touch screen includes a curved surface region, the edge region setting module 131 may set at least part of the curved surface region to the edge region.

According to an embodiment of the present disclosure, if the electronic device 100 includes a flexible electronic device, the edge region setting module 131 may recognize whether the flexible electronic device is in a bent state or a flat state and may set the edge region according to the recognized state. The edge region setting module 131 may set, for example, the edge region in a different way according to a degree to which the flexible electronic device is bent, as well as a bending position of the flexible electronic device.

According to an embodiment of the present disclosure, the edge region setting module 131 may classify the set edge region into a plurality of regions. For example, the edge region setting module 131 may classify the edge region into a touch reject region, a long press reject region, or a multi-touch reject region, etc. sequentially from both end points. The edge region setting module 131 may set areas occupied by the plurality of regions in a different way according to a size of the bezel region or a shape of the touch screen, etc. For example, the edge region setting module 131 may set the touch reject region to be broader when the size of the bezel region is smaller (e.g., when the width of the bezel is narrower).

The reject processing module 133 may reject an invalid touch input among inputs for controlling the electronic device 100. For example, the reject processing module 133 may reject a touch by a grip of the user. If a touch area has a predetermined size or more and if a touch position is included within an edge region, the touch processing module 130 may determine the touch as a grip of the user according to touch information corresponding to proximity or contact of a touch object. In this case, the reject processing module 133 may reject the touch in a different way according to the touch position. For example, the reject processing module 133 may process the touch in a different way according to a point where the touch is located among the touch reject region, the long press reject region, or the multi-touch reject region. According to an embodiment of the present disclosure, if the touch is located on the touch reject region, the reject processing module 133 may cancel the touch or may process the touch as a noise. Also, if the touch is located on the long press reject region or the multi-touch reject region, the reject processing module 133 may determine whether the touch is a long press touch or a multi-touch. If the touch is the long press touch or the multi-touch, the reject processing module 133 may cancel the touch or may process the touch as a noise.

In this regard, for example, if the touch is determined to be a grip of the user, a method of cancelling the touch may be a method in which an input corresponding to the touch is not processed. Also, for example, if the touch is the touch by the grip of the user, a method of processing the touch as the noise may be a method of processing the touch not to be recognized as a valid touch input by filtering touch intensity among touch information corresponding to the touch as intensity (e.g., intensity of a touch recognized as a valid touch input) of a predetermined level. The reject processing module 133 may cancel a touch or may process the touch as a noise by changing a reference value of sensitivity for recognizing the touch on at least part of a region of the touch screen.

FIGS. 2A and 2B are diagrams illustrating a touch by a grip of a user and setting of an edge region according to an embodiment of the present disclosure.

FIG. 2A is an anterior view of an electronic device 200, and FIG. 2B is a side view of the electronic device 200. The electronic device 200 according to an embodiment of the present disclosure may be, for example, an electronic device 100 shown in FIG. 1.

Referring to FIGS. 2A and 2B, the electronic device 200 includes a touch screen 210 and a bezel region (e.g., a left bezel region 231, a right bezel region 233, an upper bezel region 235, and a lower bezel region 237) that connects with the touch screen 210 and supports the touch screen 210. In addition to these components, the electronic device 200 may further include a plurality of function modules (e.g., a home button, a speaker, a microphone, or a camera, etc.).

According to an embodiment of the present disclosure, the touch screen 210 may be disposed on a front portion of the electronic device 200. For example, a flat region may be disposed in the center of the touch screen 210, and a curved surface region may be disposed on at least one of edges of the flat region. In FIGS. 2A and 2B, a curved surface region is disposed on a right edge of the touch screen 210. However, an edge including the curved surface region may not be limited thereto. The curved surface region may be disposed on each of both side edges of the touch screen 210. Also, the touch screen 210 may be configured with only the flat region.

According to an embodiment of the present disclosure, the electronic device 200 includes a left bezel region 231 and a left edge region 251 at a left region of the touch screen 210. The left bezel region 231 supports a left edge of the touch screen 210 and may be disposed with a designated width. The left edge region 251 may be disposed within a predetermined distance in an inner direction (i.e., a direction towards an interior) of the touch screen 210 from the left bezel region 231. The electronic device 200 also includes a right bezel region 233 and a right edge region 253 at a right region of the touch screen 210. The right bezel region 233 may support a right edge of the touch screen 210 and may be disposed with a designated width. The right edge region 253 may be disposed within a predetermined distance in an inner direction of the touch screen 210 from the right bezel region 233.

The left bezel region 231 and the left edge region 251 may be included in the flat region of the touch screen 210. A right curved surface region of the touch screen 210 may include, for example, the right bezel region 233 and the right edge region 253. The right bezel region 233 and the right edge region 253 may have a same curvature or a different curvature from each other. The electronic device 200 includes the upper bezel region 235 at an upper side of the touch screen 210 and the lower bezel region 237 at a lower side of the touch screen 210.

The touch screen 210 may receive an input by proximity or contact of a touch object and may display objects as a function of an application program or an operating system (OS) installed in the electronic device 200 is performed. For example, the touch screen 210 may receive a touch input from a user of the electronic device 200 and may display a variety of content (e.g., images, text, or videos, etc.) to user.

A bezel region that connects with the touch screen 210 and supports the touch screen 210 may be formed of the upper bezel region 235, the lower bezel region 237, the left bezel region 231, and the right bezel region 233. Each of the upper bezel region 235 and the lower bezel region 237 may include an opening to expose each of the function modules to an exterior of the electronic device 200, and may support each of the function modules. For example, a receiver may be disposed in a center of the upper bezel region 235, and a proximity sensor and a camera may be disposed at a right side of the receiver. Also, a home button may be disposed at a designated region of a central portion of the lower bezel region 237. Positions of the function modules (e.g., the receiver, the proximity sensor, the camera, or the home button, etc.) may be changed according to a manner in which the electronic device 200 is manufactured.

According to an embodiment of the present disclosure, the upper bezel region 235 and the lower bezel region 237 may be formed to be relatively broader than the left bezel region 231 and the right bezel region 233. If a display mode is a landscape mode (e.g., a display mode in a state where a screen of the electronic device 200 rotates at an angle of 90 degrees in a clockwise or counterclockwise direction from the orientation depicted in FIGS. 2A and 2B), the upper bezel region 235 and the lower bezel region 237 may be gripped by the user.

According to an embodiment of the present disclosure, if the user grips the electronic device 200, structurally or generally, part of the body of the user may be in contact with or close to the left bezel region 231 and the right bezel region 233. For example, the electronic device 200 may be structurally formed such that its longitudinal length is longer than its transverse length. Also, the transverse length of the electronic device 200 may be set to provide a comfortable sense of a grip of the user when user grips the electronic device 200 with one hand. In using the electronic device 200, the user may grip, for example, the electronic device 200 with one hand and may perform an input operation (e.g., a touch input) with the other hand. If the user grips the electronic device 200 with one hand, at least part of the hand of the user may be in contact with or close to the left bezel region 231 and the right bezel region 233.

According to an embodiment of the present disclosure, if the user grips the electronic device 200 using an operation of holding the left bezel region 231 and the right bezel region 233, for example, some of user's fingers may be in contact with the touch screen 210. For example, as shown in FIG. 2A, if the user grips the electronic device 200 with user's left hand, part of user's thumb may be in contact with a part (e.g., a region 271) of a left edge of the touch screen 210. Some of the other fingers, except for the user's thumb, may also be in contact with part (e.g., a region 273 and a region 275) of a right edge of the touch screen 210.

For example, the region 271 covers a portion of an upper side of the left bezel region 231 and may include at least some other regions of the left edge region 251 connected with the portion of the upper side. The region 271 may be, for example, included in at least one of the left edge region 251 or the left bezel region 231. In addition to the region 271, at least one of a region adjacent to the region 271, a portion of a lower side of the left bezel region 231, or a region including a portion of the left edge region 251 connected with the portion of the lower side may be further in contact with part of the user's thumb or part of user's palm connected with the thumb.

For example, the regions 273 and 275 cover a portion of a lower side of the right bezel region 233 and may include at least some other regions of the right edge region 253 connected with the portion of the lower side. Also, the regions 273 and 275 may be included in, for example, at least one of the right edge region 253 and the right edge region 253. Additionally or alternatively, at least one region may be further in contact with the right edge region 253. The above-mentioned regions 271, 273, and 275 may be points where a touch which is not intended by the user is detected and may cause a touch error.

According to an embodiment of the present disclosure, the electronic device 200 may set an edge region (e.g., the left edge region 251 and the right edge region 253), may determine whether a touch input recognized on the edge region is a touch input by a grip of the user, and may reject the touch input if the touch input is the touch by the grip. For example, the electronic device 200 may prevent a touch input recognized on a portion (e.g., the regions 271, 273, and 275) of the edge region from being processed as a valid touch input. The electronic device 200 may set the edge region to include regions (e.g., the regions 271, 273, and 275) that have a high possibility of being touched while a user grips the electronic device 200. The electronic device 200 may reject a touch input included in the edge region.

According to an embodiment of the present disclosure, a portion of region of the touch screen 210 of the electronic device 200, in which there is almost no bezel region or which connects with a bezel region, may be formed with a curved surface. For example, some of edges of the touch screen 210 may be extended to a rear surface of the electronic device 200, and a surface extended to the rear surface may be formed in the form of a curved surface. In FIGS. 2A and 2B, a right edge of the touch screen 210 is formed with a curved surface. However, a region formed with the curved surface may not be limited thereto. All of both side edges of the touch screen 210 of the electronic device 200 may be formed with a curved surface.

None of the left bezel region 231, the right bezel region 233, the upper bezel region 235, and the lower bezel region 237 connects with both side edges of the touch screen 210 and support the touch screen 210. Accordingly, the electronic device 200 may set an area of the edge region in a different way according to a size of the bezel region or a shape of the touch screen 210, etc. For example, the electronic device 200 may set a width of the edge region to increase a width of the bezel region decreases. Also, if the touch screen 210 has a curved surface, the electronic device 200 may set the edge region to be relatively broader than if the touch screen 210 is flat. According to an embodiment of the present disclosure, if the touch screen 210 includes a curved surface region, the electronic device 200 may set at least part of the curved surface region to the edge region.

According to an embodiment of the present disclosure, if the touch screen 210 includes a curved surface region as at least part of the touch screen 210, the electronic device 200 may selectively reject a touch input of the curved surface region. The electronic device 200 may selectively reject a touch input of the curved surface region according to an output state of the touch screen 210 (or a display). For example, when outputting an object (e.g., a notification function icon, etc.) to set to perform a predetermined function on the curved surface region (e.g., the left edge region 251 or the right edge region 253) in a state where a screen is not output on a front region (e.g., a region except for the right edge region 251 and the right edge region 253) of the touch screen 210, the electronic device 200 may process a touch input of the curved surface region as a valid input.

According to an embodiment of the present disclosure, if a screen is output on the front region of the touch screen 210 or if an object output on the curved surface region is not set to perform a predetermined function, the electronic device 200 may reject a touch on the curved surface region. For example, the electronic device 200 may cancel a touch input of the curved surface region, may process the touch input of the curved surface region as a noise, or may initialize touch intensity corresponding to the touch input. A method of initializing the touch intensity may include processing the touch intensity as an initialization value (e.g., zero (0) or a value of a state where a touch object is not detected, etc.). Accordingly, the electronic device 200 may prevent touch information corresponding to another touch input which occurs on a point adjacent to the touch input from being changed by the touch input.

According to an embodiment of the present disclosure, the electronic device 200 may accept or reject a touch input on an edge region of the electronic device 200 according to a type of an application executed in the electronic device 200, an operation mode (e.g., a lock mode, a secure mode, a docking mode, a power mode, or a car mode, etc.) of the electronic device 200, or information about whether the electronic device connects with another electronic device. The lock mode may include a lock state or an unlock state for at least some of functions of the electronic device 200. For example, the electronic device 200 may accept an input on an edge region in the lock state and may reject the input on the edge region in the unlock state.

The secure mode may include, for example, a state where an enterprise security solution (e.g., SAMSUNG KNOX™ enterprise security solution) is executed in the electronic device 200. For example, the electronic device 200 may display information (e.g., a received notification) associated with a business e-mail on an edge region, may authorize an input for the information if the electronic device 200 is located inside an office, and may reject the input for the information if the electronic device 200 is located outside the office. A docking mode may include, for example, a state in which the electronic device 200 is operatively coupled to a device such as a docking audio, a docking speaker, or a docking station. For example, the electronic device 200 may accept a touch on an edge region as an input for controlling the electronic device 200 while the electronic device 200 is mounted on a docking speaker.

The power mode may include, for example, at least one of a sleep mode, a power-saving mode, or an ultra power-saving mode. For example, if the remaining power of the electronic device 200 is not greater than a predetermined level, the electronic device 200 may stop detecting a grip an edge region. The car mode may be, for example, a state in which the electronic device 200 outputs a user interface provided to be used in a car. For example, the electronic device 200 may stop detecting a grip using an edge region if the electronic device 200 operates in the car mode.

According to an embodiment of the present disclosure, the electronic device 200 may selectively reject a touch input of an edge region (e.g., a curved surface region) for each application. For example, if a call receive event occurs in a sleep state, the electronic device 200 may display objects corresponding to the call receive event on just a curved surface region or the entire touch screen 210. In this case, the electronic device 200 may process a touch input of the curved surface region as a valid input. Also, if a call approval event occurs, the electronic device 200 may display objects corresponding to the call approval event. For example, the electronic device 200 may reject a touch input of the curved surface region. The electronic device 200 may selectively reject a touch input of the curved surface region in a respective a predetermined manner for each application.

According to an embodiment of the present disclosure, the electronic device 200 may accept or refrain from controlling the electronic device 200 according to a touch input on an edge region according to a configuration of a user interface (e.g., a menu or an icon, etc.) provided by an application. For example, the electronic device 200 may determine whether to reject controlling the electronic device 200 according to detected contact or proximity of an object with respect to an edge region according to whether a user interface associated with an application executed in the electronic device 200 is present on an edge region, a size of a menu or icon, or a distance between menus or icons, etc.

According to an embodiment of the present disclosure, if an application executed in the electronic device 200 is a camera application, the electronic device 200 may accept an input on an edge region as an input for controlling the electronic device 200. For example, if an application executed in the electronic device 200 is a video play application, the electronic device 200 may reject an input on an edge region.

According to an embodiment of the present disclosure, the electronic device 200 may have touch screens at two surfaces (e.g., a front surface and a rear surface). For example, the electronic device 200 may determine whether the user is gripping the electronic device 200, according to a touch detected through a touch screen located on an opposite surface of the touch screen 210. For example, the electronic device 200 may reject a touch input, detected on at least one of the touch screen located on the opposite surface (hereinafter, a "rear surface") of the touch screen 210, a left edge region, or a right edge region, among inputs for controlling the electronic device 200. The electronic device 200 may control (e.g., activate, inactivate, turn on, turn off, or change brightness) a front or rear display according to a touch detected on at least one of the touch screen located on the rear surface, the left edge region, or the right edge region.

Figure 3:
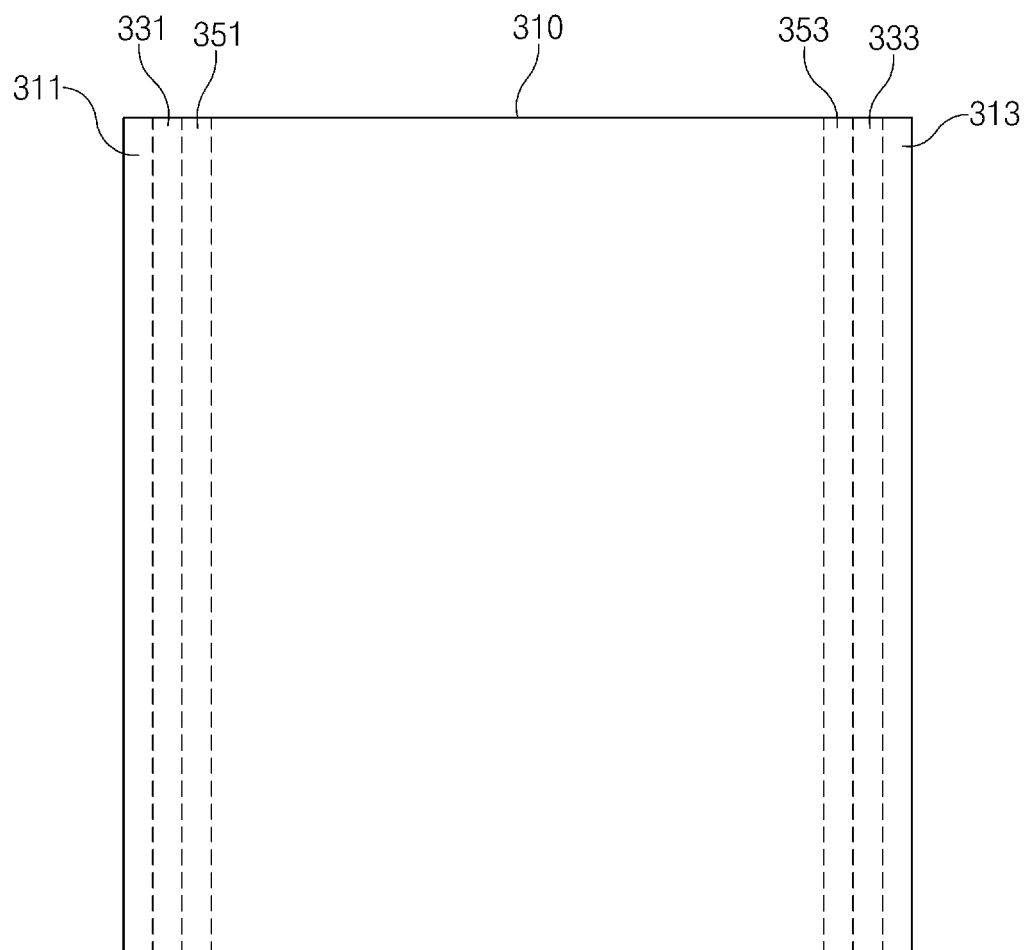
FIG. 3 is a diagram illustrating an edge region, according to an embodiment of the present disclosure.

FIG. 3 is a diagram illustrating an edge region according to an embodiment of the present disclosure.

Referring to FIG. 3, an electronic device (e.g., an electronic device 100 of FIG. 1 or an electronic device 200 shown in FIGS. 2A and 2B) may set a portion of region of a touch screen 310 to an edge region. The touch screen 310 according to an embodiment of the present disclosure may be a touch screen 210 shown in FIGS. 2A and 2B. The edge region may be a reference region for rejecting a touch from a grip of the user. For example, the electronic device may determine a touch input included in the edge region as a touch from a grip of the user and may reject the corresponding touch.

The edge region may be used for detecting a grip of the user and may include, for example, a touch reject region including a left touch reject region 311 and a right touch reject region 313, a long press reject region including a left long press reject region 331 and a right long press reject region 333, and a multi-touch reject region including a left multi-touch reject region 351 and a right multi-touch reject region 353. According to an embodiment of the present disclosure, the left touch reject region 311, the left long press reject region 331, and the left multi-touch reject region 351 may include, for example, at least one of a left edge region 251 and a left bezel region 231 shown in FIG. 2A. The right touch reject region 313, the right long press reject region 333, and the right multi-touch reject region 353 may include, for example, at least one of a right edge region 253 and a right bezel region 233 shown in FIG. 2A.

According to an embodiment of the present disclosure, each of the regions may include another region. The multi-touch reject regions 351 and 353 may be set to include, for example, at least one of the long press reject regions 331 and 333 and the touch reject regions 311 and 313. The long press reject regions 331 and 333 may be set to include, for example, the touch reject regions 311 and 313. For example, a size of the edge region may be set according to a size of an electrode or cell for detecting a touch on the touch screen 310.

A touch processing module 130 of FIG. 1 may determine a touch, detected within a region included in the touch reject regions 311 and 313 (e.g., within about 0.5 mm from an outermost point of the touch screen 310), as a touch from a grip of the user. Alternatively, for example, the touch processing module 130 may control the touch screen 310 not to detect a touch on the touch reject region. The touch processing module 130 may determine, for example, a touch, detected for at least a predetermined time (e.g., about one second or more) on a region included in the long press reject regions 331 and 333 (e.g., between about 0.5 mm to about 1.3 mm from the outermost point of the touch screen 310), as a touch from a grip of the user. For example, if a plurality of touches is detected on a region included in the multi-touch reject regions 351 and 353 (e.g., between about 0.5 mm to about 4 mm from the outermost point of the touch screen 310), the touch processing module 130 may determine the plurality of touches as a touch from a grip of the user.

According to an embodiment of the present disclosure, if at least three touches are detected in the multi-touch reject regions 351 and 353, the electronic device 100 shown in FIG. 1 may determine that the user is gripping the electronic device and may exclude at least one of the at least three touches from inputs to the electronic device 100. If at least one touch is detected on the left multi-touch reject region 351 and if at least two touches are detected on the right multi-touch reject region 353, the electronic device 100 may determine that the user is gripping the electronic device, and may exclude at least one of the at least three touches from inputs to the electronic device 100.

According to an embodiment of the present disclosure, the electronic device may classify the edge region into the touch reject region including the left touch reject region 311 and the right touch reject region 313, the long press reject region including the left long press reject region 331 and the right long press reject region 333, the multi-touch reject region including the left multi-touch reject region 351 and the right multi-touch reject region 353, etc. sequentially from both end points of the electronic device. The electronic device may more accurately process a touch by a grip of the user by selectively processing a touch input according to the classified regions.

According to an embodiment of the present disclosure, if a specific touch occurs within the touch rejection region including the left touch reject region 311 and the right touch reject region 313, the electronic device may cancel the touch or may process the touch as a noise. Alternatively, if the touch occurs within the touch rejection region including the left touch reject region 311 and the right touch reject region 313, the electronic device may initialize a touch intensity (e.g., sensitivity) among touch information corresponding to the touch. A method of initializing the touch intensity may be performed to exclude a combination of the touch and another touch that occurs at a point adjacent to the touch. For example, when using a capacitive touch input type, the electronic device 100 may process a first touch input, located within the touch reject region including the left touch reject region 311 and the right touch reject region 313, as an invalid input.

For example, if a second touch input that is not located within the touch reject region and is adjacent to the first touch input occurs simultaneously with the first touch input or occurs at intervals of a predetermined time, the electronic device may process the second touch input as a valid input. In this case, a level of a capacitance change measured by the second touch input, i.e., touch intensity may be combined with touch intensity that occurs by the first touch input to be measured. This phenomenon may cause a touch processing error of recognizing a touch, which is not intended by the user, as a valid input. The electronic device may process touch intensity corresponding to the first touch input as an initialization value (e.g., zero (0) or a value of a state where a touch object is not detected) not to be combined a touch intensity corresponding to the second touch input.

According to an embodiment of the present disclosure, if the touch occurs within the long press reject region including the left long press reject region 331 and the right long press reject region 333, the electronic device may determine whether the touch is a long press touch according to a duration of the touch. For example, if a touch is continuously input for at least a predetermined time, the electronic device may determine the touch as a long press touch. Alternatively, the electronic device may receive an input signal, for providing a notification that the touch is a long press touch, if the touch is input for at least a predetermined time, from a touch input module (e.g., a touch input module 110 of FIG. 1) or an event management module, etc. If the touch is verified as a long press touch, the electronic device may cancel the touch or may process the touch as noise. Alternatively, the electronic device may initialize a touch intensity corresponding to the touch.

According to an embodiment of the present disclosure, if a first touch occurs within the multi-touch reject region including the left multi-touch reject region 351 and the right multi-touch reject region 353, the electronic device may verify whether a second touch is also occurring simultaneously with the first touch. For example, if a second touch occurs while the first touch is input, the electronic device may recognize the first and second touches as a multi-touch. If a multi-touch is recognized, the electronic device may cancel the multi-touch or may process the multi-touch as noise. Alternatively, if a multi-touch is detected, the electronic device may initialize a touch intensity corresponding to the multi-touch.

According to an embodiment of the present disclosure, the electronic device may set an area of the touch reject region including the left touch reject region 311 and the right touch reject region 313, the long press reject region including the left long press reject region 331 and the right long press reject region 333, the multi-touch reject region including the left multi-touch reject region 351 and the right multi-touch reject region 353, etc. in a different manner according to a size of a bezel region or a shape of the touch screen 310, etc. For example, the electronic device 100 may increase a width of a touch reject region as a width of the bezel region decreases. Also, if the touch screen 310 has a curved surface, the electronic device 100 may set the touch reject region including the left touch reject region 311 and the right touch reject region 313 to be relatively broader than a width that would be set if the touch screen 310 was flat. According to an embodiment of the present disclosure, since the electronic device classifies a set edge region into a plurality of regions, if the touch reject region is set to be broader, the electronic device 100 may set the long press reject region including the left long press reject region 331 and the right long press reject region 333 and the multi-touch reject region including the left multi-touch reject region 351 and the right multi-touch reject region 353 to be relatively narrower. Alternatively, the electronic device 100 may set the edge region to be broader near a region where the touch reject region is set to be broader.

According to an embodiment of the present disclosure, sizes of bezel regions formed at both side edges of the electronic device may be different from each other, or both side shapes of the touch screen 310 may be different from each other. For example, only a right edge of the touch screen 310 (e.g., a touch screen 210 shown in FIG. 2A) of the electronic device 200 shown in FIGS. 2A and 2B may be formed with a curved surface. In this case, the electronic device may set the right edge region (e.g., the right touch reject region 313, the right long press reject region 333, and the right multi-touch reject region 353) to be relatively broader than the left edge region (e.g., the left touch reject region 311, the left long press reject region 331, and the left multi-touch reject region 351). The electronic device may also set the right touch reject region 313 to be relatively broader than the left touch reject region 311.

Figures 4A, 4B:
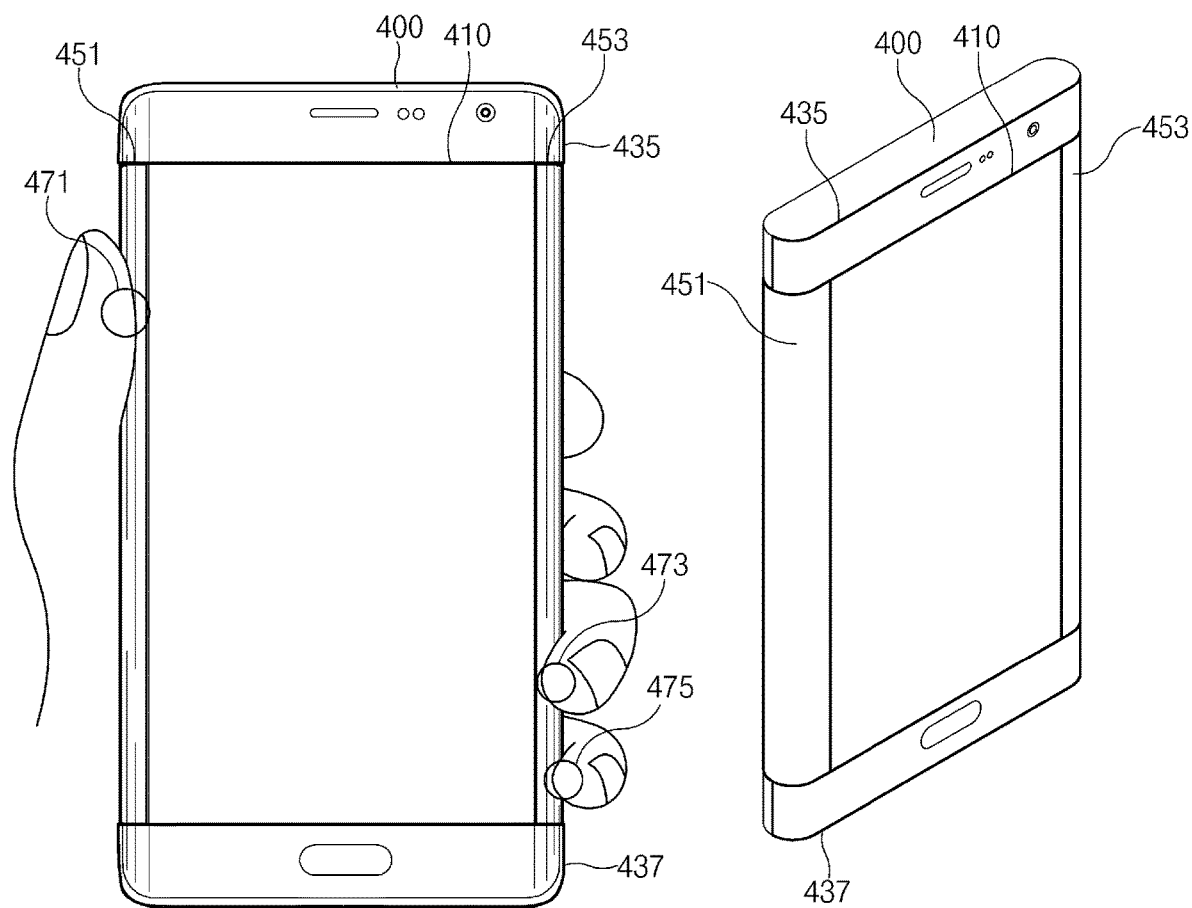
FIGS. 4A and 4B are diagrams illustrating an edge region set in a different way according to a size or shape of a bezel region according to an embodiment of the present disclosure.

FIGS. 4A and 4B are diagrams illustrating an edge region set in a different way according to a size or shape of a bezel region according to an embodiment of the present disclosure. FIG. 4A is an anterior view of an electronic device 400, and FIG. 4B is a perspective view of the electronic device 400. The electronic device 400 according to an embodiment of the present disclosure may be an electronic device 100 shown in FIG. 1 or an electronic device 200 shown in FIGS. 2A and 2B.

Referring to FIGS. 4A and 4B, both side edges of a touch screen 410 of the electronic device 400 may be formed with a curved surface. According to an embodiment of the present disclosure, an upper and a lower edge of the electronic device 400 each include a curved surface shape. There is no bezel region at both side edges of the electronic device 400. Therefore, when a user grips the electronic device 400, a user may touch some regions (e.g., regions 471, 473, and 475) of both side edges of the touch screen 410. Therefore, the electronic device 400 has an edge region including a left edge region 451 and a right edge region 453 set to be relatively broader than the edge region would be set if there were bezel regions at the both side edges of the electronic device 400.

The electronic device 400 does not include a left or right bezel region. For example, the touch screen 410 is supported by an upper bezel region 435, a lower bezel region 437, and a cover (e.g., a rear cover or a battery cover) disposed on a rear surface of the electronic device 400. Each of the upper bezel region 435 and the lower bezel region 437 may connect with a curved surface region included in each of both side edges of the touch screen 437, and a portion which supports the curved surface region may be formed with a curved surface at the same curvature or a different curvature as or from that of the curved surface region.

According to an embodiment of the present disclosure, the electronic device 400 may set the edge region including the left edge region 451 and the right edge region 453 according to body information such as a thickness or length of a finger of a user. For example, if the user mainly grips the electronic device 400 with the user's left hand, the electronic device 400 may set the left edge region 451 using a thickness or length, etc. of the user's left thumb. Also, if the user mainly grips the electronic device 400 with the user's left hand, the electronic device 400 may set the right edge region 453 using a thickness or length, etc. of each of the user's fingers (except for the user's left thumb), and vice versa. For example, if the user mainly grips the electronic device 400 with user's right hand, the electronic device 400 may set the right edge region 453 using a thickness or length, etc. of the user's right thumb and may set the left edge region 451 using a thickness or length, etc. of each of the user's fingers (except for the user's right thumb). In this regard, the electronic device 400 may receive body information, such as a kind of a hand mainly gripped by the user and a thick or length, etc. of each of fingers of a corresponding hand, from the user.

According to an embodiment of the present disclosure, the electronic device 400 may accumulate information of regions, touched when the user grips the electronic device 400, during a predetermined period of time and may set edge regions according to the information of the regions. For example, the electronic device 400 may set the edge region including the left edge region 451 and the right edge region 453 to include all of corresponding coordinates using coordinate information of regions touched when the user grips the electronic device 400. Alternatively, the electronic device 400 may set the edge region including the left edge region 451 and the right edge region 453 to include coordinates of regions which have relatively high frequency using frequency of regions touched when the user grips the electronic device 400. The electronic device 400 may guide the user to grip the electronic device 400 one or more times and set the edge region according to information of regions touched through the performed grip operation. In this regard, the electronic device 400 may output a display object (e.g., a pop-up object) or voice information for guiding the user to grip the electronic device 400 one or more times.

According to an embodiment of the present disclosure, if a portion of region of the touch screen 410 includes a curved surface region, the electronic device 400 may set the curved surface region of the touch screen 410 to an edge region. For example, the electronic device 400 may set a region, from a point where the touch screen 410 is started to be formed with a curved surface from a flat region and to a point where the touch screen 410 is ended to be formed with the curved surface, as the edge region.

Figure 5:
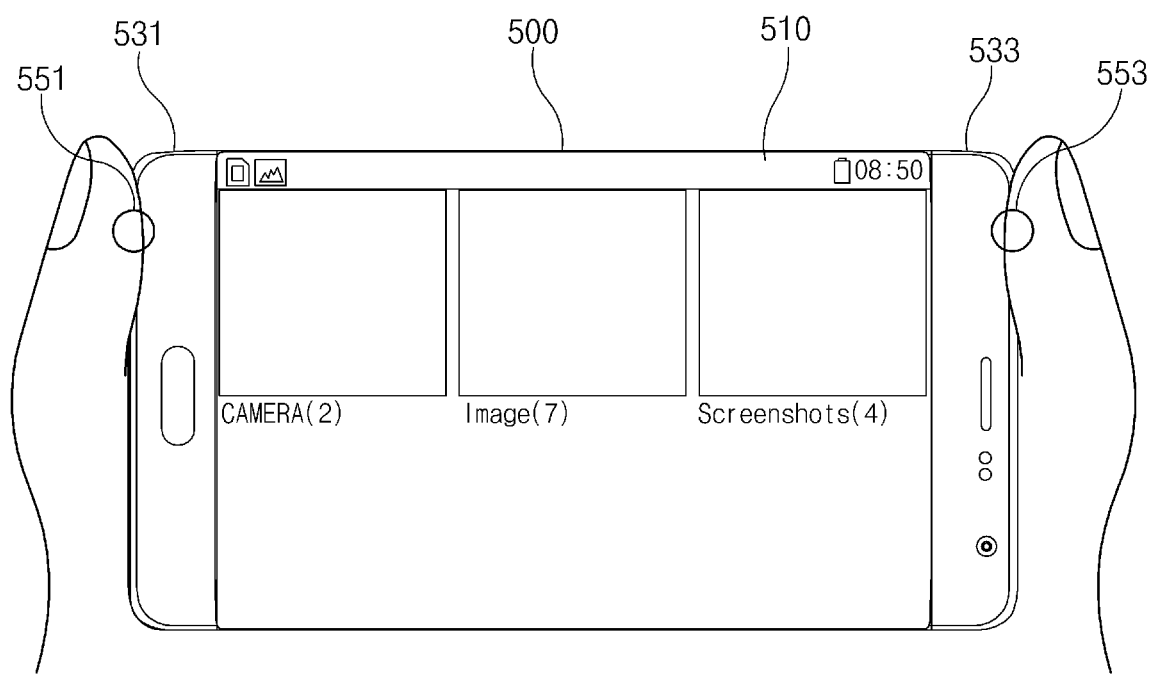
FIG. 5 is a diagram illustrating an edge region set in a different way according to a display mode according to an embodiment of the present disclosure.

FIG. 5 is a diagram illustrating an edge region set in a different way according to a display mode according to an embodiment of the present disclosure. An electronic device 500 according to an embodiment of the present disclosure may be the electronic device 200 shown in FIGS. 2A and 2B or an electronic device 400 shown in FIGS. 4A and 4B.

Referring to FIG. 5, the electronic device 500 includes a touch screen 510, a bezel region including an upper bezel region 533 and a lower bezel region 531, the bezel region connecting with the touch screen 510 and supporting the touch screen 510, and a cover that connects with the touch screen 510 and supports the touch screen 510. The upper bezel region 533 according to an embodiment of the present disclosure may be the upper bezel region 235 shown in FIG. 2A or the upper bezel region 435 shown in FIG. 4A. The lower bezel region 531 according to an embodiment of the present disclosure may be the lower bezel region 237 shown in FIG. 2A or the lower bezel region 437 shown in FIG. 4A.

According to an embodiment of the present disclosure, the electronic device 500 may display a screen in a different manner according to a display mode. For example, in general, the electronic device 500 may display a screen in a longitudinal mode (i.e., a portrait mode) in which is a display mode set such a shorter side of the touch screen 510 is oriented substantially horizontally relative to a user's line of sight. Also, if the electronic device 500 in the longitudinal mode is rotated the electronic device at an angle of about 90 degrees in a clockwise or counterclockwise direction, the electronic device 500 may display a screen in a landscape mode set such that a longer side of the display is oriented substantially horizontally relative to a user's line of sight. For example, the electronic device 500 may change a direction of an image displayed on a screen according to a relative position of the user to the electronic device 500 to display the image. In FIG. 5, the display mode of the electronic device 500 is the landscape mode.

According to an embodiment of the present disclosure, if the electronic device 500 is used in the landscape mode, in general, the user may grip the upper bezel region 533 and the lower bezel region 531 with both of the user's hands. Therefore, if the user grips the electronic device 500 in the longitudinal mode, a touch which occurs on a portion of a region of the touch screen 510 may not be touched in the landscape mode. For example, if the display mode is the landscape mode, regions touched (e.g., regions 551 and 553) by a grip of the user may not depart from the upper bezel region 533 and the lower bezel region 531.

According to an embodiment of the present disclosure, if the display mode is the landscape mode, the electronic device 500 may not set an edge region (e.g., an edge region (e.g., a left edge region 251 and a right edge region 253) shown in FIG. 2A). For example, the electronic device 500 may accept a touch input on a region in the landscape mode with respect to the region set to reject the touch input in the longitudinal mode. Additionally or alternatively, if the display mode is the landscape mode, the electronic device 500 may set the edge region to be relatively narrower than if the display mode is the longitudinal mode.

According to an embodiment of the present disclosure, the electronic device 500 may have a touch sensor in at least one of the upper bezel region 533 or the lower bezel region 531, and the electronic device 500 may set at least one of the upper bezel region 533 or the lower bezel region 531 to an edge region and may reject a touch, detected on the edge region, in the landscape mode. The electronic device 500 may determine whether to recognize a touch, detected on the upper bezel region 533 or the lower bezel region 531, as a touch input for controlling the electronic device 500 according to an arrangement orientation of the electronic device 500 (i.e., whether the electronic device is in a landscape mode or a portrait mode) and a size of each of the upper bezel region 533 and the lower bezel region 531.

Figures 6A, 6B:
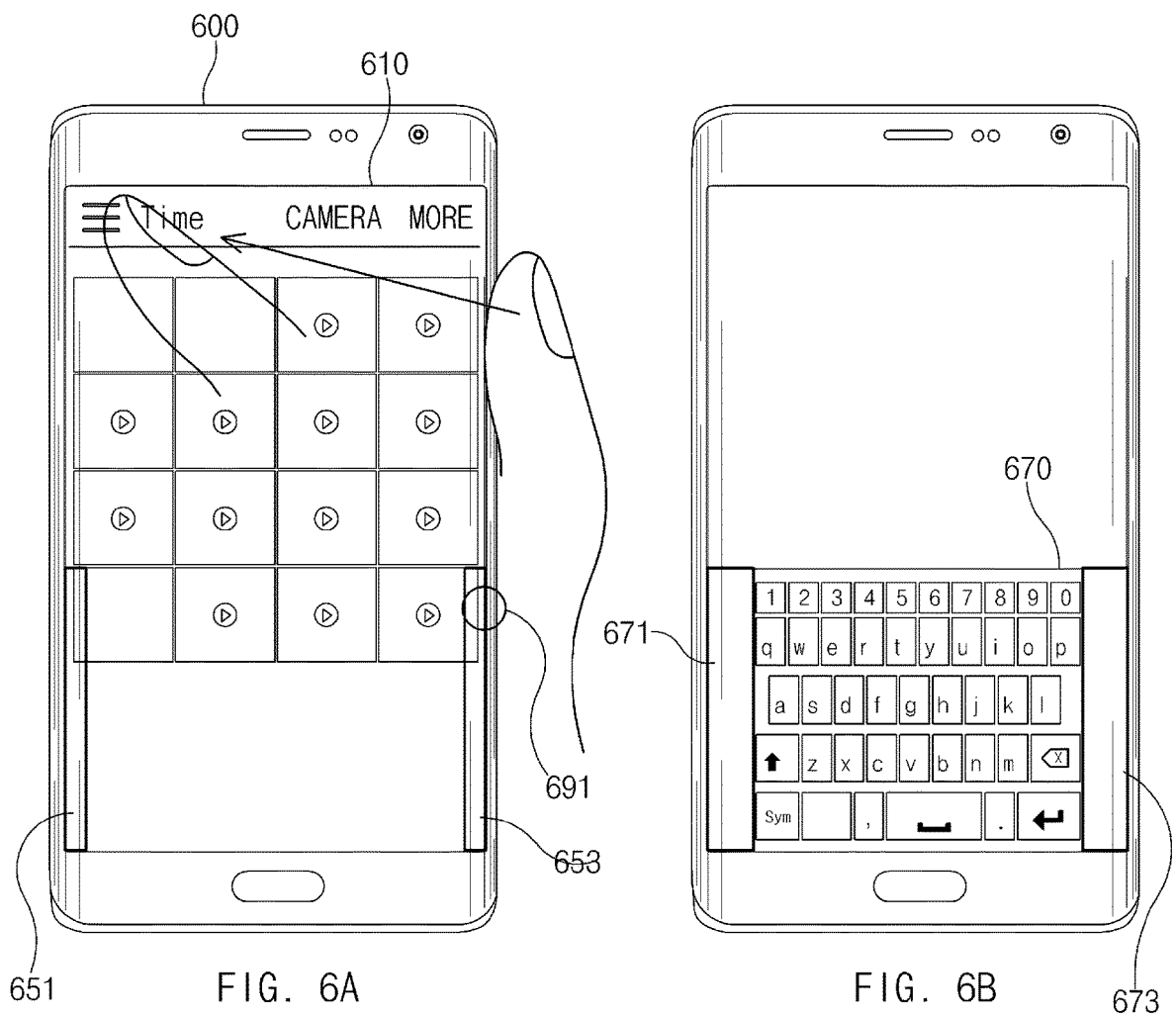
FIGS. 6A and 6B are diagrams illustrating an edge region set in a different way for each touch mode or for each application according to an embodiment of the present disclosure.

FIGS. 6A and 6B are diagrams illustrating an edge region set in a different manner for each touch mode or for each application according to an embodiment of the present disclosure. A touch screen 610 is disposed on a front portion of an electronic device 600. The electronic device 600 also includes a bezel region including a left bezel region 231, a right bezel region 233, an upper bezel region 235, and a lower bezel region 237 shown in FIG. 2A, such that the bezel region connects with the touch screen 610 and supports the touch screen 610.

According to an embodiment of the present disclosure, the electronic device 600 may not include a bezel region. For example, there may be no bezel region including the left bezel region 231 and the right bezel region 233 shown in FIG. 2A at both side edges of the electronic device 600. Also, a portion of an edge of the touch screen 610 and a portion of the bezel region that connects with the portion of the edge and supports the portion of the edge may be formed with a curved surface. For example, the electronic device 600 may have the same or similar configuration and shape as or to that of an electronic device of FIGS. 2A and 2B or an electronic device 400 of FIGS. 4A and 4B.

According to an embodiment of the present disclosure, the electronic device 600 may set a region, which is within a predetermined distance in an inner direction of the touch screen 610 (i.e., a direction towards an interior of the touch screen 610) from the bezel region, to an edge region. The electronic device 600 may set the edge region in a different manner according to a size of the bezel region or a shape of the touch screen 610, and may set the edge region according to a touch mode or for each application.

Referring to FIG. 6A, the electronic device 600 supports a one-handed touch mode. The one-handed touch mode may be set such that a user is able to touch the electronic device 660 with only one hand. For example, the electronic device 600 may move display regions to a portion of region (e.g., a region that may be touched by only one hand) of a screen in the one-handed touch mode to display the display regions.

According to an embodiment of the present disclosure, the electronic device 600 may set only part of a region of the touch screen 610 to a touch function available region in the one-handed touch mode. The electronic device 600 may set a touch function available region of the touch screen 610 to correspond to a portion of region of the screen on which display objects are moved in the one-handed touch mode. For example, if a region, except for the region of the screen on which display objects are moved in the one-handed touch mode, is touched, the electronic device 600 may cancel the touch or may process the touch as a noise. In this regard, the electronic device 600 may receive body information (e.g., information corresponding to an area of user's palm or a length of user's finger, etc.) of the user from user to determine a region that may be touched by user's one hand. Also, the electronic device 600 may guide the user to touch a region with one hand at least once and determine a region, which may be touched by the hand, according to information regarding regions touched by the user's hand.

According to an embodiment of the present disclosure, if the touch mode is set to the one-handed touch mode, the electronic device 600 may set an edge region including a left edge region 651 and a right edge region 653 as only a lower region among both side edges of the touch screen 610. The electronic device 600 may set a width of the edge region to be relatively broader than a width of an edge region set in a two-handed touch mode. For example, in the one-handed touch mode, the user may touch the touch screen 610 using user's thumb and may support a rear surface of the electronic device 600 using the other fingers except for the thumb. Therefore, there may be a case in which there is no touch region including regions 271, 273, and 275 of FIG. 2A, that occurs as a result of gripping the electronic device 600 with user's one hand in the two-handed touch mode, in the one-handed touch mode.

Also, a touch region 691 by a grip of the user may be limited to a lower region among both side edges of the touch screen 610 due to positions of display objects moved in the one-handed touch mode. According to an embodiment of the present disclosure, the electronic device 600 may set the edge region including the left edge region 651 and the right edge region 653 according to a set touch function available region. For example, the electronic device 600 may set the edge region to be the same as the touch function available region, or may set the edge region to part of the touch function available region, for example, an edge.

Referring to FIG. 6B, the electronic device 600 may display an on-screen keyboard 670 on a portion of region of the touch screen 610. The on-screen keyboard 670 is an input interface, may be a virtual input panel to be used instead of a physical input panel, and may be implemented with software. According to an embodiment of the present disclosure, the electronic device 600 may display the on-screen keyboard 670 on a lower region of the touch screen 610 to receive text such as characters, numbers, or symbols and images, such as emoticons, from the user when user writes a message.

According to an embodiment of the present disclosure, the electronic device 600 may exclude a blank region including a left blank region 671 and a right blank region 673 of the on-screen keyboard 670 from a touch function available region. In this case, the electronic device 600 may set the blank region including the left blank region 671 and the right blank region 673 to an edge region. The electronic device 600 may reject a corresponding touch input if an unused region is touched by a grip operation by setting the unused region to an edge region. Additionally, if an unused region is present among edges of the touch screen 610 for each application, the electronic device 600 may set the region to an edge region.

According to an embodiment of the present disclosure, the electronic device 600 may display the on-screen keyboard 670 using the other regions except for a predetermined edge region (e.g., an edge region which is preset by the user or an edge region which is set automatically from a use pattern of user). For example, the electronic device 600 may change a size, position, etc. of the on-screen keyboard 670 according to an edge region to display the one-screen keyboard 670.

According to an embodiment of the present disclosure, the electronic device (e.g., an electronic device 100 shown in FIG. 1) may recognize a contact form (e.g., a contact shape, a contact size, the number of contacts, etc.) between the user and the electronic device and may provide different functions according to the recognized contact form. If a first grip form is recognized, the electronic device may provide a corresponding first function. If a second grip form is recognized, the electronic device may provide a corresponding second function. The electronic device may instead perform a predetermined function according to a kind of a grip, without executing a function associated with a menu or icon located on a region where a grip is detected. Additionally, the electronic device may combine responses of a sensor (e.g., an acceleration sensor) and may designate a function according to a grip of the user.

According to an embodiment of the present disclosure, the electronic device may be a wearable electronic device. The electronic device may set a region, in which a body of the user is in contact with the electronic device, to an edge region, if the user is wearing the electronic device.

According to an embodiment of the present disclosure, the electronic device may be a device (e.g., a watch) worn on a user's wrist. If a single input is detected through a bezel region (e.g., a touch sensitive housing around a display), the electronic device may perform a corresponding function. If a plurality of inputs is detected through the bezel region, the electronic device may reject the plurality of inputs.

According to an embodiment of the present disclosure, the electronic device may process a detected touch input except for a grip of the user in a different manner according to a recognized grip form. If a first grip form is recognized, the electronic device may provide a first function in response to a touch input recognized outside a region where the first grip form is recognized. For example, if a second grip form is recognized, the electronic device may provide a second function, which is different from the first function, in response to the touch input recognized outside a region where the second grip form is recognized. If a request for executing an application is verified, the electronic device may execute the corresponding application if the first grip form is recognized. However, the electronic device may not execute the corresponding application or may request the user to perform additional authentication if the second grip form is recognized instead of the first grip form.

According to an embodiment of the present disclosure, the electronic device may change an authentication method, for accessing at least some of functions of the electronic device, according to a recognized grip form. The electronic device may request user to perform authentication through a pattern lock. If the user grips the electronic device using a second method, the electronic device may request user to perform authentication through user's fingerprint.

According to an embodiment of the present disclosure, the electronic device may determine whether a user's hand that is gripping the electronic device is the user's right or left hand. The electronic device may set each edge region (e.g., a shape, a position, and a size) in a different manner according to whether the user grips the electronic device with user's left or right hand.

According to an embodiment of the present disclosure, if the electronic device recognizes that the user is gripping the electronic device, the electronic device may move an icon, a menu, etc., located on a position corresponding to a touch input to another position. If a camera application is executed, the electronic device may move an icon (e.g., a photographing button) associated with the camera application to another position according to a method of griping the electronic device. According to an embodiment of the present disclosure, if hovering is detected above a region where there is the icon (e.g., the photographing button) associated with the camera application, the electronic device may move the corresponding icon to another position.

According to an embodiment of the present disclosure, the electronic device may include a touch screen configured to detect at least one touch event and a processor configured to recognize a touch input according to the at least one touch event. The processor may determine whether to recognize the at least one touch event as the touch input according to a distance between a location of the at least one touch event and an edge of the touch screen.

According to an embodiment of the present disclosure, if the distance is included within a predetermined range, the processor may ignore the at least one touch event.

According to an embodiment of the present disclosure, if the distance is included within a predetermined range and if the at least one touch event is detected for at least a predetermined duration, the processor may ignore the at least one touch event.

According to an embodiment of the present disclosure, the at least one touch event may include a plurality of touch events. If the distance is included within a predetermined range, the processor may ignore the plurality of touch events.

According to an embodiment of the present disclosure, if a screen of the electronic device is displayed in a landscape orientation, the processor may recognize the at least one touch event as the touch input.

According to an embodiment of the present disclosure, if the distance is included within a predetermined range and if proximity of an external object to the electronic device is detected in connection with the at least one touch event, the processor may ignore the at least one touch event.

According to an embodiment of the present disclosure, the touch screen may include a bent region which forms at least part of a lateral surface of the electronic device. If the at least one touch event is detected within the bent region, the processor may ignore the at least one touch event.

According to an embodiment of the present disclosure, the at least one touch event may include a first touch event and a second touch event. If a distance between a location of the first touch event and a left edge of the touch screen is included within a first range and if a distance between a location of the second touch event and a right edge of the touch screen is included within a second range, the processor may ignore the first touch event and the second touch event.

According to an embodiment of the present disclosure, the processor may determine whether to recognize the at least one touch event as a touch input based on a kind of an application associated with the at least one touch event.

According to an embodiment of the present disclosure, if a distance between the location of the at least one touch event and an edge of the touch screen is included within a first range, the processor may recognize the at least one touch event as the touch input and perform a first function corresponding to the touch input. If the distance is included within a second range, the processor may recognize the at least one touch event as the touch input and perform a second function corresponding to the touch input.

Figure 7:
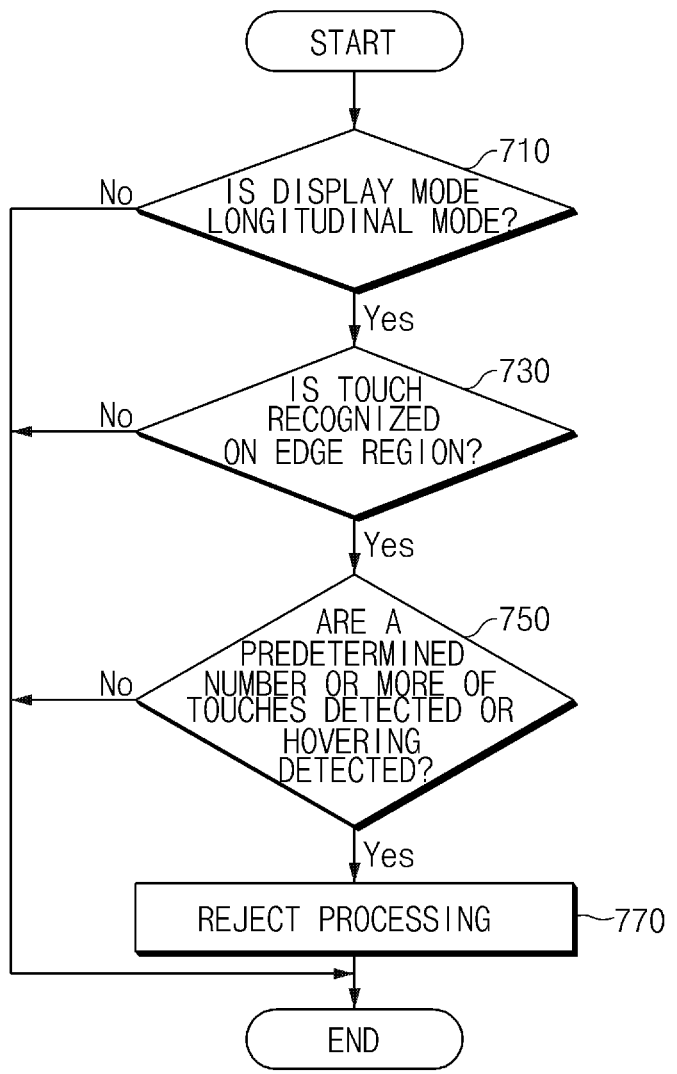
FIG. 7 is a flowchart illustrating a method of operating an electronic device associated with a touch processing method according to an embodiment of the present disclosure.

FIG. 7 is a flowchart illustrating a method of operating an electronic device associated with a touch processing method according to an embodiment of the present disclosure.

Referring to FIG. 7, in operation 710, an electronic device (e.g., an electronic device 200 shown in FIGS. 2A and 2B)

verifies whether a display mode is a longitudinal mode (i.e., a portrait mode). If the display mode is not the longitudinal mode (e.g., the display mode is a landscape mode), the electronic device may process an input touch as a valid input. According to an embodiment of the present disclosure, if a transverse length of the electronic device is structurally longer than a longitudinal length, the electronic device may further determine whether the display mode is the landscape mode. If the display mode is not the landscape mode or the portrait mode, the electronic device may process an input touch as a valid input.

According to an embodiment of the present disclosure, instead of verifying the display mode in operation 710 and determining whether to perform reject processing according to the display mode, the electronic device may verify a size of a bezel region including a left bezel region 231, a right bezel region 233, an upper bezel region 235, and a lower bezel region 237 of FIG. 2A, and may determine whether a size of a bezel region where a grip of the user is detected at least equal to a predetermined size. If the size of the bezel region is at least equal to a predetermined size, the electronic device may process an input touch as a valid input. The electronic device may omit an operation of determining whether to perform reject processing according to the display mode. For example, a method performed by the electronic device may omit operation 710 and instead start at operation 730.

In operation 730 the electronic device determines whether a touch is recognized on an edge region, which includes the left edge region 251 and the right edge region 253 of FIG. 2A. If a touch is not recognized on the edge region, the electronic device may process the touch as a valid input. If the touch is recognized on the edge region, the electronic device processes the touch differently according to a predetermined condition.

In operation 750, for example, the electronic device determines whether at least a predetermined number simultaneous touches (e.g., at least two touches) are detected. Additionally or alternatively, the electronic device may determine whether hovering is detected (e.g., whether the touch is close to a touch screen or whether a value measured by a self-capacitance type is at least a predetermined value). According to an embodiment of the present disclosure, the electronic device may determine whether a touch area corresponding to the touch is at least equal to a predetermined size. For example, the electronic device may calculate a touch area according to a touch coordinate included in touch information. Alternatively, the electronic device may measure the number of touched nodes that indicates points where electrodes including in the touch screen are overlapped or connected each other corresponding to a touch coordinate and may determine whether the number of the touched nodes is at least a predetermined number of nodes.

If the predetermined number of touches is not detected on the edge region, and/or if the hovering is not detected above the edge region, the electronic device may process the touch as a valid input. According to an embodiment of the present disclosure, if a touch area corresponding to the touch is less than a predetermined size, the electronic device may process the touch as a valid input.

According to an embodiment of the present disclosure, if at least the predetermined number of touches is detected on the edge region or if the hovering is detected above the edge region, the electronic device may verify a set edge region. If a touch area corresponding to the touch is greater than or equal to a predetermined size, the electronic device may verify a set edge region.

In operation 770, for example, the electronic device rejects at least some of the touches. For example, if a position of the touch is included within a touch rejection region, the electronic device may cancel the touch or may process the touch as a noise. Alternatively, if the position of the touch is included within the touch reject region, the electronic device may initialize touch intensity corresponding to the touch.

For example, if the position of the touch is included within a long press reject region, the electronic device may determine whether the touch is a long press touch. For example, the electronic device may measure duration of the touch relative to a time when the touch is input. If the duration of the touch is a predetermined time or more (e.g., if the touch is the long press touch), the electronic device may process the touch in a manner that would be the same as or similar to processing of a touch included within the touch reject region. Also, if the position of the touch is included within a multi-touch reject region, the electronic device may determine whether the touch is a multi-touch. For example, the electronic device may determine whether at least the predetermined number of touches is detected. If the touch is the multi-touch, the electronic device may process the touch to be same as or similar to if the touch is included within the touch reject region.

According to an embodiment of the present disclosure, a touch processing method of the electronic device may include detecting at least one touch event through a touch screen functionally connected with the electronic device and determining whether to recognize the at least one touch event as a touch input, according to a distance between a location of the at least one touch event and an edge of the touch screen.

According to an embodiment of the present disclosure, if the distance is included within a predetermined range, the determining whether to recognize the at least one touch event as the touch input may include ignoring the at least one touch event.

According to an embodiment of the present disclosure, if the distance is included within a predetermined range and if the at least one touch event is detected for at least a predetermined duration, the determining whether to recognize the at least one touch event as the touch input may include ignoring the at least one touch event.

According to an embodiment of the present disclosure, the at least one touch event may include a plurality of touch events. If the distance is included within a predetermined range, the determining whether to recognize the at least one touch event as the touch input may include ignoring the plurality of touch events.

According to an embodiment of the present disclosure, if a screen of the electronic device is displayed in a landscape orientation, the determining whether to recognize the at least one touch event as the touch input may include recognizing the at least one touch event as the touch input.

According to an embodiment of the present disclosure, if the distance is included within a predetermined range and if proximity of an external object to the electronic device without contacting the electronic device is detected in connection with the at least one touch event, the determining whether to recognize the at least one touch event as the touch input may include ignoring the at least one touch event.

According to an embodiment of the present disclosure, the touch screen may include a bent region that forms at least part of a lateral surface of the electronic device. If the at least one touch event is detected within the bent region, the determining whether to recognize the at least one touch event as the touch input may include ignoring the at least one touch event.

According to an embodiment of the present disclosure, the at least one touch event may include a first touch event and a second touch event such that at least a portion of the first touch event and the second touch occur simultaneously. If a distance between a location of the first touch event and a left edge of the touch screen is included within a first range and if a distance between a location of the second touch event and a right edge of the touch screen is included within a second range, the determining whether to recognize the at least one touch event as the touch input may include ignoring the first touch event and the second touch event.

According to an embodiment of the present disclosure, the determining whether to recognize the at least one touch event as the touch input may include determining whether to recognize the at least one touch event as a touch input based on a kind of an application associated with the touch event.

According to an embodiment of the present disclosure, a computer-readable recording medium storing embodied thereon instructions, when executed by at least one processor, for allowing the at least one processor to perform at least one operation, the at least one operation including detecting at least one touch event through a touch screen functionally connected with an electronic device and determining whether to recognize the at least one touch event as a touch input according to a distance between a location of the at least one touch event and an edge of the touch screen.

Figure 8:
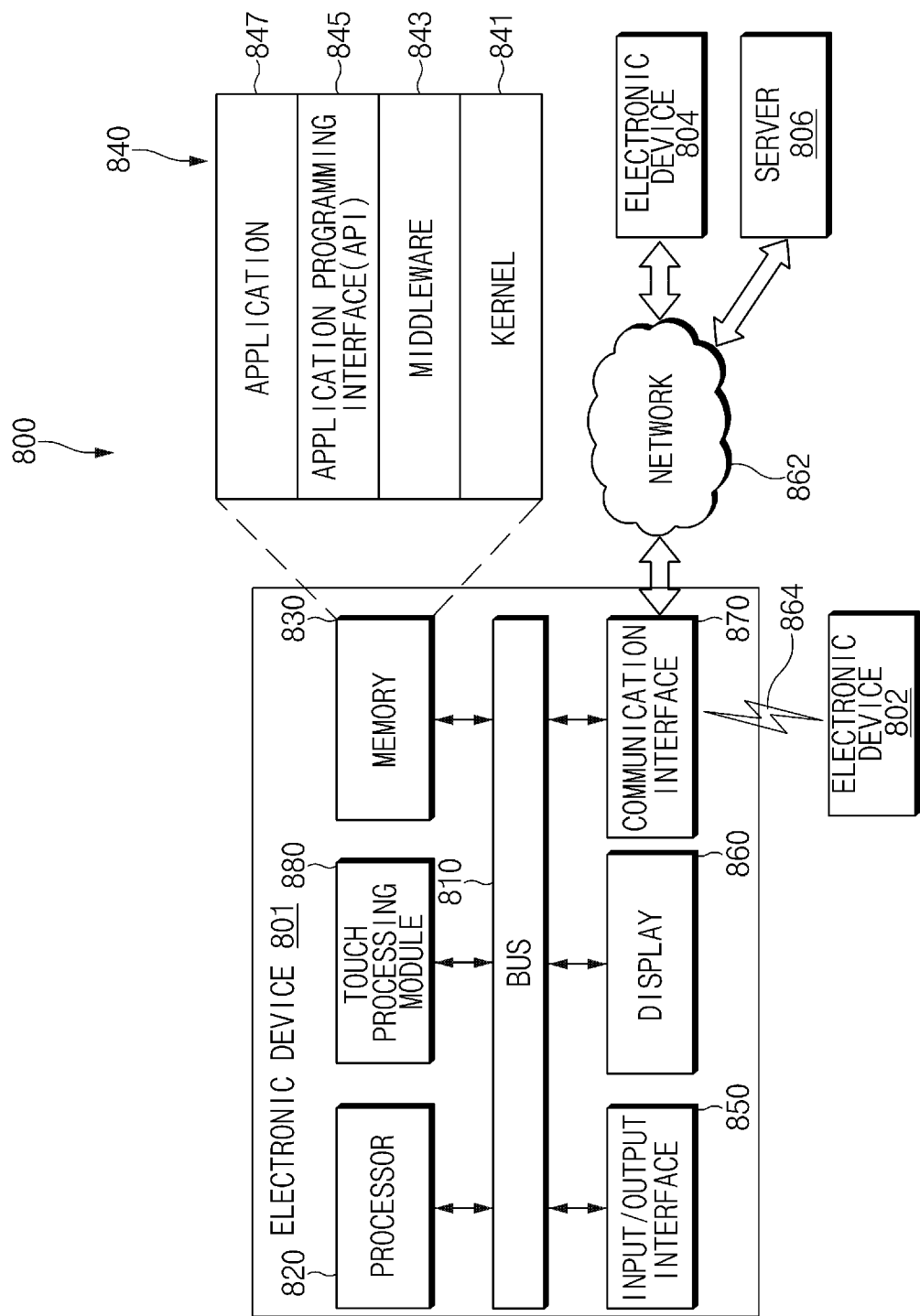
FIG. 8 is a block diagram illustrating a configuration of an electronic device in a network environment according to an embodiment of the present disclosure.

FIG. 8 is a block diagram illustrating a configuration of an electronic device in a network environment according to an embodiment of the present disclosure An electronic device 801 is included in a network environment 800. The electronic device 801 according to an embodiment of the present disclosure may be an electronic device 100 shown in FIG. 1. The electronic device 801 includes a bus 810, a processor 820, a memory 830, an input and output interface 850, a display 860, a communication interface 870, and a touch processing module 880. At least one of the components may be omitted from the electronic device 801, and other components may be additionally included in the electronic device 801.

The bus 810 may be, for example, a circuit which connects the components 820 to 880 with each other and transmits communication (e.g., a control message and/or data) between the components.

The processor 820 may include one or more of a central processing unit (CPU), an application processor (AP), or a communication processor (CP). For example, the processor 820 may perform calculation or data processing about control and/or communication of at least another of the components of the electronic device 801.

The memory 830 may include a volatile and/or nonvolatile memory. The memory 830 may store, for example, instructions or data associated with at least another of the components of the electronic device 801. According to an embodiment of the present disclosure, the memory 830 may include software and/or a program 840. The program 840 includes, for example, a kernel 841, a middleware 843, an application programming interface (API) 845, and an application program 847 (i.e., an "application"). At least part of the kernel 841, the middleware 843, or the API 845 may be referred to as an operating system (OS).

The kernel 841 may control or manage, for example, system resources (e.g., the bus 810, the processor 820, or the memory 830, etc.) used to execute an operation or function implemented in the other programs (e.g., the middleware 843, the API 845, or the application program 847). As the middleware 843, the API 845, or the application program 847 accesses a separate component of the electronic device 801, the kernel 841 may provide an interface that may control or manage system resources.

The middleware 843 may operate as, for example, a go-between such that the API 845 or the application program 847 communicates with the kernel 841 to communicate data.

Also, the middleware 843 may process one or more work requests received from the application program 847 according to a priority. For example, the middleware 843 may provide a priority that, in turn, provides system resources (the bus 810, the processor 820, or the memory 830, etc.) of the electronic device 801 to at least one of the application program 847. For example, the middleware 843 may perform scheduling or load balancing for at least one work request by processing the at least one work request according to the priority provided to the at least one application program 847.

The API 845 may be, for example, an interface in which the application program 847 controls a function provided from the kernel 841 or the middleware 843. For example, the API 845 may include at least one interface or function (e.g., an instruction) for file control, window control, image processing, or text control, etc.

The input and output interface 850 operate as, for example, an interface which may transmit instructions or data input from a user or another external device to another component (or other components) of the electronic device 801. Also, input and output interface 850 may output instructions or data received from another component (or other components) of the electronic device 801 to the user or the other external device.

The display 860 may include, for example, a liquid crystal display (LCD), a light emitting diode (LED) display, an organic LED (OLED) display, a microelectromechanical systems (MEMS) display, or an electronic paper display. The display 860 may display, for example, a variety of content (e.g., text, images, videos, icons, or symbols, etc.) to the user. The display 860 may include a touch screen, and may receive, for example, touch, gesture, proximity, or a hovering input using an electronic pen or part of a body of the user. A touch input module 110 shown in FIG. 1 may include the input and output interface 850 or the display 860 shown in FIG. 8.

The communication interface 870 may establish communication between, for example, the electronic device 801 and an external device (e.g., a first external electronic device 802, a second external electronic device 804, or a server 806). For example, the communication interface 870 may connect to a network 862 through wireless communication or wired communication and may communicate with the external device (e.g., the second external electronic device 804 or the server 806).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), etc. as a cellular communication protocol. Also, the wireless communication may include, for example, local-area communication 864. The local-area communication 864 may include, for example, at least one of wireless-fidelity (Wi-Fi) communication, Bluetooth (BT) communication, near field communication (NFC), or global navigation satellite system (GNSS) communication, etc. A GNSS may include, for example, at least one of a global positioning system (GPS), a Glonass, a Beidou navigation satellite system (hereinafter referred to as a "Beidou"), or a Galileo (i.e., the European global satellite-based navigation system) according to an available area or a bandwidth, etc. Herein, the term "GPS" may be used interchangeably with the term "GNSS". The wired communication may include at least one of, for example, universal serial bus (USB) communication, high definition multimedia interface (HDMI) communication, recommended standard 232 (RS-232) communication, or plain old telephone service (POTS) communication, etc. The network 862 may include a telecommunications network, for example, at least one of a computer network (e.g., a local area network (LAN) or a wide area network (WAN)), the Internet, or a telephone network.

The touch processing module 880 may detect a plurality of user inputs through a surface which may recognize a touch and may modify (e.g., reject) at least some of the plurality of user inputs according to a position where the plurality of user inputs are detected. The touch processing module 880 according to an embodiment of the present disclosure may be the touch processing module 130 shown in FIG. 1. According to an embodiment of the present disclosure, the touch processing module 880 may be provided to be included in the processor 820 or be independent of the processor 820.

Each of the first and second external electronic devices 802 and 804 may be the same or a different type of device as the electronic device 801. According to an embodiment of the present disclosure, the server 806 may include a group of one or more servers. According to an embodiment of the present disclosure, all or some of operations executed in the electronic device 801 may be executed in another electronic device or a plurality of electronic devices (e.g., the first and second external electronic devices 802 and 804 or the server 806). According to an embodiment of the present disclosure, if the electronic device 801 is to perform any function or service automatically or according to a request, it may request another device, such as the first and second external electronic devices 802 and 804 or the server 806 to perform at least part of the function or service, rather than executing the function or service for itself or in addition to the function or service. The other electronic device may execute the requested function or the added function and may transmit the executed result to the electronic device 801. The electronic device 801 may process the received result without change or additional, and may provide the requested function or service. For this purpose, for example, cloud computing technologies, distributed computing technologies, or client-server computing technologies may be used by the electronic device 801 in accordance with embodiments of the present disclosure.

Figure 9:
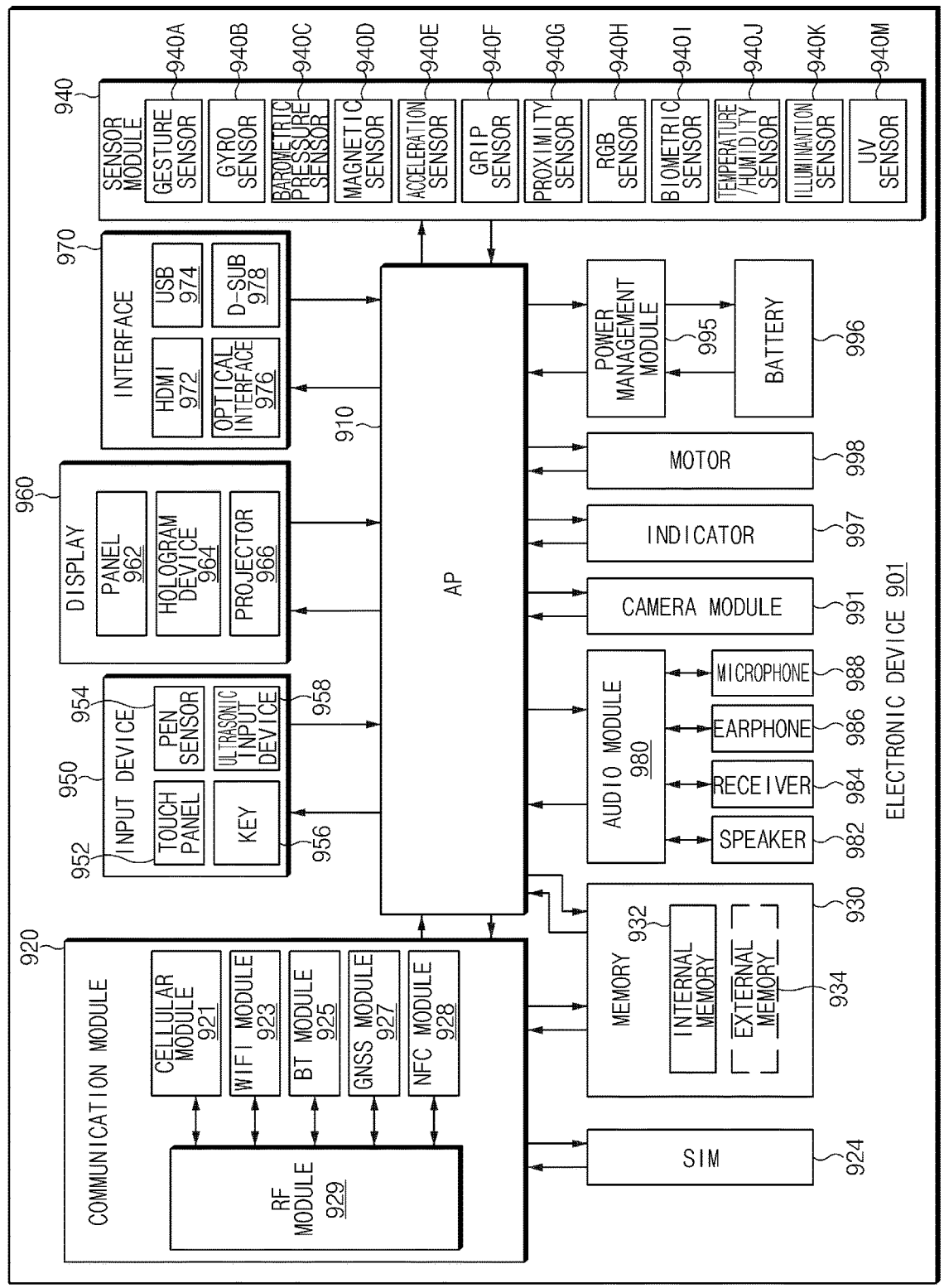
FIG. 9 is a block diagram illustrating a configuration of an electronic device according to an embodiment of the present disclosure.

FIG. 9 is a block diagram illustrating a configuration of an electronic device 901 according to an embodiment of the present disclosure. The electronic device 901 may include, for example, all or part of an electronic device 801 shown in FIG. 8. The electronic device 901 includes at least one processor 910 (e.g., application processors (APs)), a communication module 920, a subscriber identification module (SIM) card 924, a memory 930, a sensor module 940, an input device 950, a display 960, an interface 970, an audio module 980, a camera module 991, a power management module 995, a battery 996, an indicator 997, and a motor 998.

The processor 910 may drive, for example, an operating system (OS) or an application program to control a plurality of hardware or software components connected thereto and may process and compute a variety of data. The processor 910 may be implemented with, for example, a system on chip (SoC). According to an embodiment of the present disclosure, the processor 910 may further include a graphic processing unit (GPU) and/or an image signal processor. The processor 910 may include one or more (e.g., a cellular module 921) of the other components shown in FIG. 9. The processor 910 may load instructions or data received from at least one of other components (e.g., a non-volatile memory) to a volatile memory to process the data and may store various data in a non-volatile memory.

The communication module 920 may have the same or similar configuration as a configuration of a communication interface 870 of FIG. 8. The communication module 920 includes, for example, the cellular module 921, a wireless-fidelity (Wi-Fi) module 923, a Bluetooth (BT) module 925, a global navigation satellite system (GNSS) module 927 (e.g., a GPS module, a Glonass module, a Beidou module, or a Galileo module), a near field communication (NFC) module 928, and a radio frequency (RF) module 929.

The cellular module 921 may provide, for example, a voice call service, a video call service, a text message service, or an Internet service, etc. through a communication network. According to an embodiment of the present disclosure, the cellular module 921 may identify and authenticate the electronic device 901 in a communication network using the SIM card 924. According to an embodiment of the present disclosure, the cellular module 921 may perform at least a part of functions that may be provided by the processor 910. According to an embodiment of the present disclosure, the cellular module 921 may include a communication processor (CP).

The Wi-Fi module 923, the BT module 925, the GNSS module 927, or the NFC module 928 may include, for example, a processor for processing data transmitted and received through the corresponding module. According to an embodiment of the present disclosure, at least some (e.g., two or more) of the cellular module 921, the Wi-Fi module 923, the BT module 925, the GNSS module 927, or the NFC module 928 may be included in one integrated chip (IC) or one IC package.

The RF module 929 may transmit and receive, for example, a communication signal (e.g., an RF signal). The RF module 929 may include, for example, a transceiver, a power amplifier module (PAM), a frequency filter, or a low noise amplifier (LNA), or an antenna, etc. At least one of the cellular module 921, the Wi-Fi module 923, the BT module 925, the GNSS module 927, or the NFC module 928 may transmit and receive an RF signal through a separate RF module.

The SIM card 924 may include, for example, a SIM and/or an embedded SIM. The SIM card 924 may include unique identification information (e.g., an integrated circuit card identifier (ICCID)) or subscriber information (e.g., an international mobile subscriber identity (IMSI)).

The memory 930 (e.g., a memory 830 of FIG. 8) may include, for example, an embedded memory 932 or an external memory 934. The embedded memory 932 may include at least one of, for example, a volatile memory (e.g., a dynamic random access memory (DRAM), a static RAM (SRAM), a synchronous dynamic RAM (SDRAM), etc.), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, etc.), a hard drive, or a solid state drive (SSD)).

The external memory 934 may further include a flash drive, for example, a compact flash (CF), a secure digital (SD), a micro-SD, a mini-SD, an extreme digital (xD), or a memory stick, etc. The external memory 934 may functionally and/or physically connect with the electronic device 901 through various interfaces.

The sensor module 940 may measure, for example, a physical quantity or may detect an operation state of the electronic device 901, and may convert the measured or detected information to an electric signal. The sensor module 940 includes, for example, a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (e.g., red, green, blue (RGB) sensor), a biometric sensor 940I, a temperature/humidity sensor 940J, an illumination sensor 940K, or an ultraviolet (UV) sensor 940M.

Additionally or alternatively, the sensor module 940 may further include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor, etc. The sensor module 940 may further include a control circuit for controlling at least one or more sensors included therein. According to an embodiment of the present disclosure, the electronic device 901 may further include a processor configured to control the sensor module 940, as part of the processor 910 or to be independent of the processor 910. While the processor 910 is in a sleep state, the electronic device 901 may control the sensor module 940.

The input device 950 may include, for example, a touch panel 952, a (digital) pen sensor 954, a key 956, or an ultrasonic input unit 958. The touch panel 952 may recognize a touch input using at least one of, for example, a capacitive detecting method, a resistive detecting method, an infrared detecting method, or an ultrasonic detecting method. Also, the touch panel 952 may further include a control circuit. The touch panel 952 may further include a tactile layer and may provide a tactile reaction to a user.

The (digital) pen sensor 954 may be, for example, part of a touch panel or may include a separate sheet for recognition. The key 956 may include, for example, a physical button, an optical key, or a keypad. The ultrasonic input unit 958 may allow the electronic device 901 to detect a sound wave using a microphone 988 and to verify data through an input tool generating an ultrasonic signal.

The display 960 may include a panel 962, a hologram device 964, or a projector 966. The panel 962 may include the same or similar configuration as or to that of the display 860. The panel 962 may be, for example, flexible, transparent, or wearable. The panel 962 and the touch panel 952 may be integrated into a single module. The hologram device 964 may show a stereoscopic image in a space using interference of light. The projector 966 may project light onto a screen to display an image. The screen may be positioned, for example, inside or outside the electronic device 901. According to an embodiment of the present disclosure, the display 960 may further include a control circuit for controlling the panel 962, the hologram device 964, or the projector 966.

The interface 970 includes, for example, a high-definition multimedia interface (HDMI) 972, a universal serial bus (USB) 974, an optical interface 976, or a D-subminiature 978. The interface 970 may be included in, for example, the communication interface 870 shown in FIG. 8. Additionally or alternatively, the interface 970 may include, for example, a mobile high definition link (MHL) interface, an SD card/multimedia card (MMC) interface, or an infrared data association (IrDA) standard interface.

The audio module 980 may convert a sound into an electric signal, or vice versa. At least part of components of the audio module 980 may be included in, for example, an input and output interface 850 shown in FIG. 8. The audio module 980 may process sound information input or output through, for example, a speaker 982, a receiver 984, an earphone 986, the microphone 988, etc.

The camera module 991 may capture a still image and video. According to an embodiment of the present disclosure, the camera module 991 may include at least one image sensors (e.g., a front sensor or a rear sensor), a lens, an image signal processor (ISP), or a flash (e.g., an LED or a xenon lamp).

The power management module 995 may manage, for example, power of the electronic device 901. According to an embodiment of the present disclosure, though not shown, the power management module 995 may include a power management integrated circuit (PMIC), a charger IC or a battery gauge. The PMIC may have a wired charging method and/or a wireless charging method. The wireless charging method may include, for example, a magnetic resonance method, a magnetic induction method, or an electromagnetic method, etc. An additional circuit for wireless charging, for example, a coil loop, a resonance circuit, or a rectifier, etc. may be further provided. The battery gauge may measure, for example, the remaining capacity of the battery 996 and voltage, current, or temperature thereof while the battery 996 is charged. The battery 996 may include, for example, a rechargeable battery or a solar battery.

The indicator 997 may display a specific state of the electronic device 901 or part (e.g., the processor 910) thereof, for example, a booting state, a message state, or a charging state, etc. The motor 998 may convert an electric signal into mechanical vibration and may generate vibration or a haptic effect, etc. The electronic device 901 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and etc.

The term "module", as used herein, may refer to, for example, a unit including one of hardware, software, and firmware or two or more combinations thereof. The term "module" may be interchangeably used with, for example, terminologies "unit", "logic", "logical block", "component", "circuit", etc. The term "module" may refer to a minimum unit of an integrated component or a part thereof. The term "module" may refer to a minimum unit for performing at least one function or a part thereof. Herein, a "module" may be mechanically or electronically implemented. For example, the term "module" may refer to at least one of an application-specific integrated circuit (ASIC) chip, field-programmable gate arrays (FPGAs), or a programmable-logic device that is well known or will be developed in the future, for performing certain operations.

According to an embodiment of the present disclosure, at least part of the electronic device (e.g., modules or the functions) or the method (e.g., operations) may be implemented with, for example, instructions stored in a computer-readable storage media which has a program module.

Modules or program modules according to an embodiment of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to an embodiment of the present disclosure, an electronic device may prevent a touch input that is not intended to be processed by the user, from occurring, and may prevent an error which may occur due to the touch input that is not intended by user, by rejecting at least a portion of the touch input corresponding to the user's grip.

According to an embodiment of the present disclosure, the electronic device may enhance accuracy of input recognition by recognizing a user input that is not intended by the user if the user input is detected within a predetermined distance from an outer region of the electronic device.

According to an embodiment of the present disclosure, the electronic device may increase touch function availability of a curved surface region by selectively rejecting a touch input of the curved surface region if a portion of region of the touch screen includes the curved surface region.

According to an embodiment of the present disclosure, a touch processing method for determining whether a touch input is a touch by a grip of a user and rejecting the touch input if the touch input is the touch by the grip, and an electronic device for supporting the same, are provided.

According to another embodiment of the present disclosure, a touch processing method for setting a portion of region of a touch screen to an edge region and selectively rejecting a touch input detected on the touch screen according to the edge region, and an electronic device for supporting the same, are provided.

According to another embodiment of the present disclosure, a touch processing method for selectively rejecting a touch input of a curved surface region if a portion of region of a touch screen includes the curved surface region, and an electronic device for supporting the same, are provided.

While the present disclosure has been shown and described with reference to certain embodiments thereof, it will be understood by those skilled in the art that various changes in form and details may be made therein without departing from the spirit and scope of the present disclosure. Therefore, the scope of the present disclosure is defined not by the detailed description of the present disclosure, but by the appended claims and their equivalents.

What is claimed is:

1. A portable electronic device, comprising:
a touch screen display including a planar display area and a curved display area, the planar display area corresponding to at least part of a front surface of the portable electronic device and the curved display area corresponding to at least part of a side surface of the portable electronic device; and
a processor configured to:
obtain touch information including a touch coordinate and a touch duration via the touch screen display,
identify that a touch event corresponding to the touch information has occurred on the curved display area based on the touch coordinate being included in the curved display area,
determine a type of the identified touch event based on at least one of the touch coordinate and the touch duration,
execute a function corresponding to the identified touch event based on determining that the type of the identified touch event corresponds to a touch input, and
ignore the identified touch event based on determining that the type of the identified touch event corresponds to a long-touch input or a multi-touch input,
define, within the curved display area, a first touch rejection region located adjacent to an edge of the touch screen display included in the curved display area, the first touch rejection region being defined by a first boundary located a first distance from the edge, and
define, within the curved display area, a second touch rejection region located adjacent to the edge of the touch screen display included in the curved display area, the second touch rejection region being defined by a second boundary located a second distance from the edge.

2. The portable electronic device of claim 1, wherein the processor is further configured to:
determine that the touch input is received on a graphical object displayed via the curved display area, and
execute the function corresponding to the graphical object.

3. The portable electronic device of claim 1, wherein the processor comprises a touch processing integrated circuit (IC).

4. The portable electronic device of claim 1, wherein the processor is further configured to determine that the type of the identified touch event corresponds to the long-touch input by determining that the touch duration is greater than a predetermined duration.

5. The portable electronic device of claim 1, wherein the processor is further configured to determine that the type of the identified touch event corresponds to the multi-touch input by determining that the touch coordinate includes multiple values.

6. The portable electronic device of claim 1, wherein the processor is further configured to:
define a touch rejection region located adjacent to an edge of the touch screen display, and
ignore the identified touch event when the touch coordinate is included in the touch rejection region.

7. The portable electronic device of claim 1, wherein the processor is further configured to:
determine the type of the identified touch event as the multi-touch input, when the touch coordinate is included in the first touch rejection region, and
ignore the multi-touch input.

8. The portable electronic device of claim 1, wherein the processor is further configured to:
determine that the type of the identified touch event corresponds to the long-touch input, when the touch coordinate is included in the second touch rejection region and the touch duration is greater than a predetermined duration, and
ignore the long-touch input.

* * * * *